(12) United States Patent
Hirakawa et al.

(10) Patent No.: US 8,624,951 B2
(45) Date of Patent: Jan. 7, 2014

(54) OPTICAL SCANNING DEVICE AND IMAGE FORMING APPARATUS

(75) Inventors: Makoto Hirakawa, Kanagawa (JP); Yoshinori Hayashi, Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 450 days.

(21) Appl. No.: 12/362,050

(22) Filed: Jan. 29, 2009

(65) Prior Publication Data

US 2009/0214261 A1 Aug. 27, 2009

(30) Foreign Application Priority Data

Jan. 31, 2008 (JP) .................................. 2008-020019

(51) Int. Cl.
*B41J 15/14* (2006.01)

(52) U.S. Cl.
USPC .......................................................... 347/244

(58) Field of Classification Search
USPC .......................................................... 347/244
See application file for complete search history.

(56) References Cited

U.S. PATENT DOCUMENTS

| | | |
|---|---|---|
| 5,557,448 A | 9/1996 | Endo et al. |
| 5,570,224 A | 10/1996 | Endo et al. |
| 5,581,392 A | 12/1996 | Hayashi |
| 5,652,670 A | 7/1997 | Hayashi |
| 5,875,051 A | 2/1999 | Suzuki et al. |
| 6,069,724 A | 5/2000 | Hayashi et al. |
| 6,081,386 A | 6/2000 | Hayashi et al. |
| 6,104,522 A | 8/2000 | Hayashi et al. |
| 6,185,026 B1 | 2/2001 | Hayashi et al. |
| 6,198,562 B1 | 3/2001 | Hayashi et al. |
| 6,369,927 B2 | 4/2002 | Hayashi |
| 6,400,391 B1 | 6/2002 | Suhara et al. |
| 6,404,530 B1 * | 6/2002 | Takeuchi ................... 359/196.1 |
| 6,462,853 B2 | 10/2002 | Hayashi |
| 6,587,245 B2 | 7/2003 | Hayashi |
| 6,657,765 B2 | 12/2003 | Hayashi et al. |
| 6,757,089 B2 | 6/2004 | Hayashi |
| 6,768,506 B2 | 7/2004 | Hayashi et al. |
| 6,771,296 B2 | 8/2004 | Hayashi et al. |
| 6,771,407 B2 | 8/2004 | Hayashi et al. |
| 6,788,444 B2 | 9/2004 | Suzuki et al. |

(Continued)

FOREIGN PATENT DOCUMENTS

| | | |
|---|---|---|
| JP | 2000-171741 | 6/2000 |
| JP | 2002-287062 | 10/2002 |

(Continued)

OTHER PUBLICATIONS

Japanese Office Action (2008-020019) dated Oct. 27, 2011.

*Primary Examiner* — Uyen Chau N Le
*Assistant Examiner* — Hoang Tran
(74) *Attorney, Agent, or Firm* — Oblon, Spivak, McClelland, Maier & Neustadt, L.L.P.

(57) ABSTRACT

An optical scanning device that scans a scanning surface with a light beam includes a light source that emits the light beam and a pre-deflector optical system that includes at least one diffractive optical element including a diffraction surface having no power at room temperature. The diffraction surface has a multi-step shape having a plurality of zone surfaces substantially perpendicular to an optical axis and a plurality of step surfaces each adjacent to each of the zone surfaces. On a cross sectional plane of the diffraction surface including the optical axis, each of the zone surfaces and each of the step surfaces makes an obtuse angle.

16 Claims, 17 Drawing Sheets

(56) References Cited

U.S. PATENT DOCUMENTS

| | | | |
|---|---|---|---|
| 6,803,941 B2 | 10/2004 | Hayashi et al. | |
| 6,804,064 B2 | 10/2004 | Hirakawa | |
| 6,822,671 B2 | 11/2004 | Inagaki | |
| 6,829,102 B2 | 12/2004 | Ohashi et al. | |
| 6,903,856 B2 | 6/2005 | Hayashi | |
| 6,906,739 B2 | 6/2005 | Suzuki et al. | |
| 6,934,061 B2 | 8/2005 | Ono et al. | |
| 6,956,685 B2 | 10/2005 | Hayashi | |
| 6,987,593 B2 | 1/2006 | Hayashi et al. | |
| 7,006,120 B2 | 2/2006 | Sakai et al. | |
| 7,050,210 B2 | 5/2006 | Atsuumi et al. | |
| 7,068,296 B2 | 6/2006 | Hayashi et al. | |
| 7,088,484 B2 | 8/2006 | Hayashi et al. | |
| 7,106,483 B2 | 9/2006 | Hayashi et al. | |
| 7,145,705 B2 | 12/2006 | Hayashi | |
| 7,218,432 B2 | 5/2007 | Ichii et al. | |
| 7,236,281 B2 | 6/2007 | Hayashi et al. | |
| 7,253,937 B2 | 8/2007 | Ueda et al. | |
| 7,271,823 B2 | 9/2007 | Izumi et al. | |
| 7,271,824 B2 | 9/2007 | Omori et al. | |
| 7,362,486 B2 | 4/2008 | Hayashi et al. | |
| 7,385,181 B2 | 6/2008 | Miyatake et al. | |
| 7,417,777 B2 | 8/2008 | Saisho et al. | |
| 7,443,558 B2 | 10/2008 | Sakai et al. | |
| 7,471,434 B2 | 12/2008 | Nakamura et al. | |
| 2002/0036827 A1* | 3/2002 | Nakai | 359/565 |
| 2002/0149668 A1* | 10/2002 | Kato | 347/244 |
| 2003/0053156 A1 | 3/2003 | Satoh et al. | |
| 2004/0036936 A1 | 2/2004 | Nakajima et al. | |
| 2004/0136043 A1* | 7/2004 | Iizuka | 359/204 |
| 2005/0201219 A1* | 9/2005 | Hotsuta et al. | 369/44.11 |
| 2005/0243396 A1 | 11/2005 | Fujii et al. | |
| 2005/0265151 A1* | 12/2005 | Kimura et al. | 369/44.37 |
| 2005/0269496 A1* | 12/2005 | Hayashi | 250/235 |
| 2006/0232659 A1 | 10/2006 | Hayashi et al. | |
| 2006/0239312 A1* | 10/2006 | Kewitsch et al. | 372/29.023 |
| 2006/0245009 A1 | 11/2006 | Akiyama et al. | |
| 2006/0284968 A1 | 12/2006 | Hayashi et al. | |
| 2007/0002417 A1 | 1/2007 | Hirakawa et al. | |
| 2007/0030538 A1 | 2/2007 | Hirakawa et al. | |
| 2007/0058255 A1 | 3/2007 | Imai et al. | |
| 2007/0064291 A1* | 3/2007 | Kashimura | 359/204 |
| 2007/0211324 A1 | 9/2007 | Sakai et al. | |
| 2007/0253048 A1 | 11/2007 | Sakai et al. | |
| 2007/0297036 A1 | 12/2007 | Nakamura et al. | |
| 2008/0024849 A1 | 1/2008 | Hayashi et al. | |
| 2008/0025759 A1 | 1/2008 | Ichii et al. | |
| 2008/0062491 A1 | 3/2008 | Nakamura et al. | |
| 2008/0068689 A1 | 3/2008 | Saisho et al. | |
| 2008/0068693 A1 | 3/2008 | Hayashi et al. | |
| 2008/0100895 A1 | 5/2008 | Hayashi et al. | |
| 2008/0100920 A1* | 5/2008 | Nakai | 359/641 |
| 2008/0123159 A1 | 5/2008 | Hayashi et al. | |
| 2008/0180772 A1 | 7/2008 | Miyatake et al. | |
| 2008/0192319 A1 | 8/2008 | Miyatake et al. | |
| 2008/0204840 A1 | 8/2008 | Watanabe et al. | |
| 2008/0204841 A1 | 8/2008 | Suzuki et al. | |
| 2008/0204842 A1 | 8/2008 | Arai et al. | |
| 2008/0212999 A1 | 9/2008 | Masuda et al. | |
| 2008/0218827 A1 | 9/2008 | Watanabe et al. | |
| 2008/0219601 A1 | 9/2008 | Arai et al. | |
| 2008/0266633 A1 | 10/2008 | Hirakawa et al. | |
| 2008/0267662 A1 | 10/2008 | Arai et al. | |
| 2008/0267663 A1 | 10/2008 | Ichii et al. | |
| 2008/0284838 A1 | 11/2008 | Suzuki et al. | |
| 2008/0285104 A1 | 11/2008 | Arai et al. | |
| 2009/0060582 A1 | 3/2009 | Ichii et al. | |

FOREIGN PATENT DOCUMENTS

| | | |
|---|---|---|
| JP | 2007-233002 | 9/2007 |
| JP | 2007-241182 | 9/2007 |
| JP | 2007-293182 | 11/2007 |

* cited by examiner

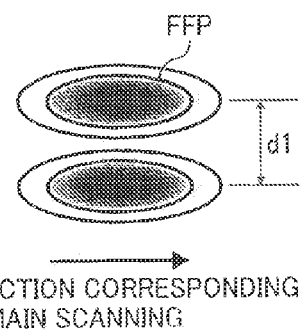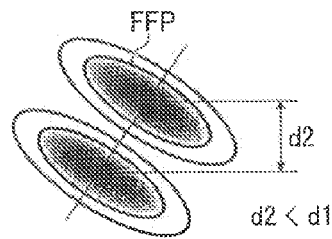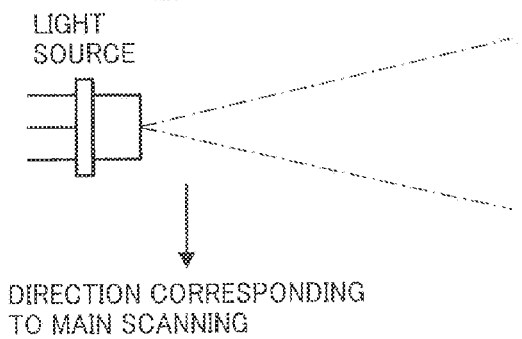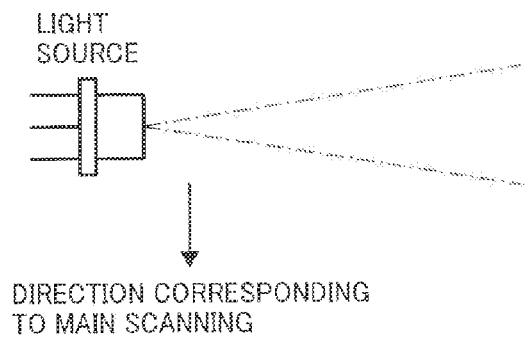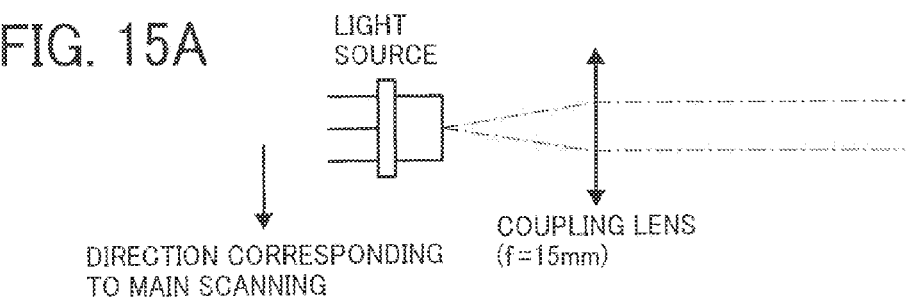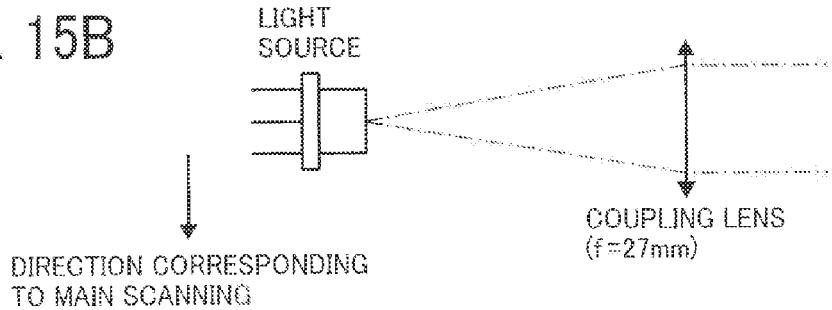

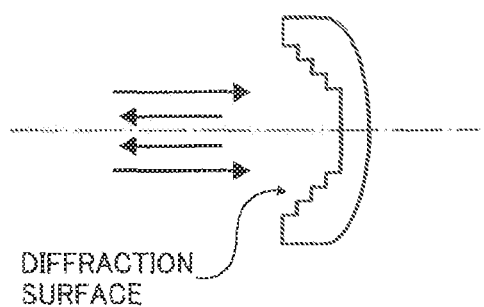
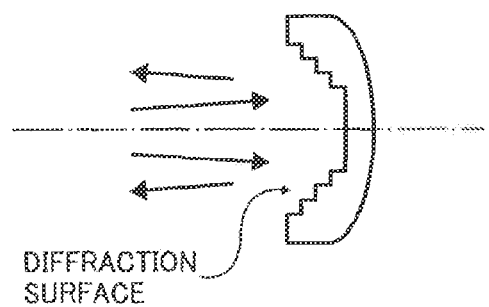
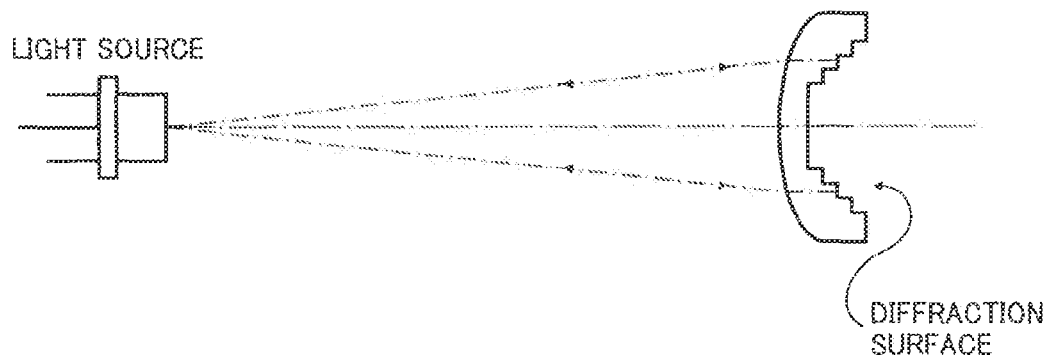
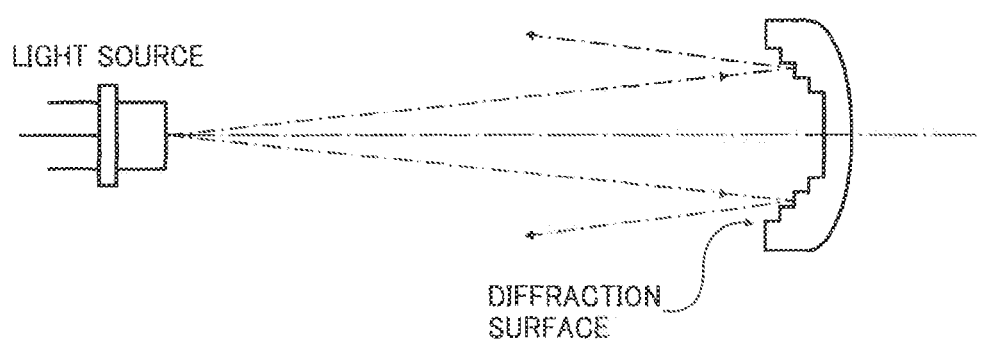

FIG. 20

|  | DEFLECTOR-SIDE SCANNING LENS ||
|  | FIRST SURFACE | SECOND SURFACE |
| --- | --- | --- |
| $R_y$ | −279.876 | −83.588 |
| $R_z$ | −61.000 | |
| K | 0 | $-5.492 \times 10^{-1}$ |
| A4 | $1.756 \times 10^{-7}$ | $2.748 \times 10^{-7}$ |
| A6 | $-5.492 \times 10^{-11}$ | $-4.502 \times 10^{-12}$ |
| A8 | $1.088 \times 10^{-14}$ | $-7.366 \times 10^{-15}$ |
| A10 | $-3.183 \times 10^{-19}$ | $1.803 \times 10^{-18}$ |
| A12 | $-2.635 \times 10^{-24}$ | $2.728 \times 10^{-23}$ |
| B1 | $-2.066 \times 10^{-6}$ | |
| B2 | $5.728 \times 10^{-6}$ | |
| B3 | $3.152 \times 10^{-8}$ | |
| B4 | $2.280 \times 10^{-9}$ | |
| B5 | $-3.730 \times 10^{-11}$ | |
| B6 | $-3.283 \times 10^{-12}$ | |
| B7 | $1.766 \times 10^{-14}$ | |
| B8 | $1.373 \times 10^{-15}$ | |
| B9 | $-2.890 \times 10^{-18}$ | |
| B10 | $-1.985 \times 10^{-19}$ | |

FIG. 21

| | DEFLECTOR-SIDE SCANNING LENS | |
|---|---|---|
| | THIRD SURFACE | FOURTH SURFACE |
| Ry | 6965.000 | 765.951 |
| Rz | 110.907 | -68.224 |
| K | 0 | 0 |
| A4 | $1.550 \times 10^{-8}$ | $-1.150 \times 10^{-7}$ |
| A6 | $1.293 \times 10^{-14}$ | $1.097 \times 10^{-11}$ |
| A8 | $-8.811 \times 10^{-18}$ | $-6.542 \times 10^{-16}$ |
| A10 | $-9.182 \times 10^{-22}$ | $1.984 \times 10^{-20}$ |
| A12 | 0 | $-2.412 \times 10^{-25}$ |
| B1 | $-9.594 \times 10^{-7}$ | 0 |
| B2 | $-2.135 \times 10^{-7}$ | $3.644 \times 10^{-7}$ |
| B3 | $-8.080 \times 10^{-12}$ | 0 |
| B4 | $2.391 \times 10^{-12}$ | $-4.847 \times 10^{-13}$ |
| B5 | $2.881 \times 10^{-14}$ | 0 |
| B6 | $3.694 \times 10^{-15}$ | $-1.666 \times 10^{-18}$ |
| B7 | $-3.259 \times 10^{-18}$ | 0 |
| B8 | $1.814 \times 10^{-20}$ | $4.535 \times 10^{-19}$ |
| B9 | $8.722 \times 10^{-23}$ | 0 |
| B10 | $-1.341 \times 10^{-23}$ | $-2.819 \times 10^{-23}$ |

FIG. 22

| | COUPLING LENS | |
|---|---|---|
| | INCIDENCE PLANE | OUTPUT PLANE |
| EFFECTIVE DIAMETER [mm] | φ6 | φ6 |
| K | — | 0 |
| A4 | — | $1.948073 \times 10^{-5}$ |
| A6 | — | $4.448515 \times 10^{-8}$ |
| A8 | — | $1.167348 \times 10^{-9}$ |
| A10 | — | $-2.106458 \times 10^{-11}$ |

| d1 | d2 | d3 | d4 | d5 | CYLINDRICAL LENDS-POLYGON MIRROR |
|---|---|---|---|---|---|
| 23.30 | 2.50 | 27.00 | 92.02 | 3.00 | 69.96 |

| d6 | d7 | d8 | d9 | d10 |
|---|---|---|---|---|
| 63.27 | 22.59 | 75.86 | 4.90 | 158.72 |

UNIT: mm

FIG. 25

| | DEFLECTOR-SIDE SCANNING LENS | |
|---|---|---|
| | FIRST SURFACE | SECOND SURFACE |
| $R_y$ | −120.000 | −59.279 |
| $R_z$ | −400.000 | −505.000 |
| K | 0 | 0 |
| A4 | $8.885 \times 10^{-7}$ | $9.224 \times 10^{-7}$ |
| A6 | $-2.629 \times 10^{-10}$ | $-6.778 \times 10^{-11}$ |
| A8 | $2.185 \times 10^{-14}$ | $-4.112 \times 10^{-14}$ |
| A10 | $1.368 \times 10^{-17}$ | $1.373 \times 10^{-17}$ |
| A12 | $-3.135 \times 10^{-21}$ | $2.070 \times 10^{-21}$ |
| B1 | 0 | 0 |
| B2 | 0 | $-4.551 \times 10^{-6}$ |
| B3 | 0 | $-5.866 \times 10^{-9}$ |
| B4 | 0 | $3.192 \times 10^{-9}$ |
| B5 | 0 | $-1.886 \times 10^{-11}$ |
| B6 | 0 | $-1.575 \times 10^{-11}$ |
| B7 | 0 | $3.320 \times 10^{-14}$ |
| B8 | 0 | $1.647 \times 10^{-14}$ |
| B9 | 0 | $-1.294 \times 10^{-17}$ |
| B10 | 0 | $-4.930 \times 10^{-18}$ |

FIG. 26

|  | DEFLECTOR-SIDE SCANNING LENS | |
|---|---|---|
|  | THIRD SURFACE | FOURTH SURFACE |
| Ry | -10000.000 | 540.625 |
| Rz | 320.000 | -42.835 |
| K | 0 | 0 |
| A4 | $3.286 \times 10^{-7}$ | $1.278 \times 10^{-7}$ |
| A6 | $-7.085 \times 10^{-11}$ | $-4.629 \times 10^{-11}$ |
| A8 | $6.269 \times 10^{-15}$ | $4.049 \times 10^{-15}$ |
| A10 | $-2.732 \times 10^{-19}$ | $-1.660 \times 10^{-19}$ |
| A12 | $4.739 \times 10^{-24}$ | $2.585 \times 10^{-24}$ |
| B1 | $4.485 \times 10^{-7}$ | 0 |
| B2 | $-1.047 \times 10^{-6}$ | $2.420 \times 10^{-7}$ |
| B3 | $-4.439 \times 10^{-11}$ | 0 |
| B4 | $5.737 \times 10^{-11}$ | 0 |
| B5 | $7.922 \times 10^{-15}$ | 0 |
| B6 | $1.602 \times 10^{-14}$ | 0 |
| B7 | $1.153 \times 10^{-18}$ | 0 |
| B8 | $-2.015 \times 10^{-18}$ | 0 |
| B9 | $-1.471 \times 10^{-22}$ | 0 |
| B10 | $6.921 \times 10^{-23}$ | 0 |

FIG. 27

| d1 | d2 | d3 | d4 | d5 | CYLINDRICAL LENDS-POLYGON MIRROR |
|---|---|---|---|---|---|
| 23.30 | 2.50 | 26.80 | 76.76 | 3.00 | 63.28 |

| d6 | d7 | d8 | d9 | d10 |
|---|---|---|---|---|
| 46.02 | 13.50 | 89.31 | 3.50 | 141.02 |

UNIT: mm

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2008-020019 filed in Japan on Jan. 31, 2008.

BACKGROUND OF THE INVENTION

1. Field of the Invention

The present invention relates to a technology for scanning a target surface with a light beam.

2. Description of the Related Art

In recent years, there has been a growing demand for image forming apparatuses, such as optical printing apparatuses, digital copiers, and optical plotters, which are inexpensive and provide highly stable image quality regardless of temperature changes.

When the temperature changes, the oscillation wavelength of the light source or the shape of an optical element may change, and these changes may cause a shift in imaging position, which decreases the image quality.

The adoption of a diffractive optical element has been proposed as an effective solution to this problem (e.g., see Japanese Patent Application Laid-open No. 2002-287062 and Japanese Patent Application Laid-open No. 2007-241182). A diffractive optical element can be regarded as an optical element having negative dispersion. The entire scanning optical system is temperature compensated by endowing the diffractive optical element with diffraction power high enough to cancel out a shift in mage-forming position, thus enhancing the stability of image quality.

However, the laser-scanning apparatus disclosed in Japanese Patent Application Laid-open No. 2002-287062 has a problem in that manufacturing is difficult and expensive because a transmissive surface and a reflecting surface need to be formed and a curved reflecting surface also needs to be provided in one optical element. In addition, because this laser-scanning apparatus includes an optical element with a large height in the sub-scanning direction, if it is used, for example, in a so-called tandem color machine, the size of the machine will be increased.

On the other hand, for the optical scanning device disclosed in Japanese Patent Application Laid-open No. 2007-241182, because a collimator lens with a multi-level diffraction surface is made of resin, the collimator lens itself has a large linear expansion coefficient of $7.0\times10^{-5}$/K. This leads to a large phase function coefficient, that is, to large diffraction power, which causes the optical scanning device to be vulnerable to a change in wavelength.

SUMMARY OF THE INVENTION

It is an object of the present invention to at least partially solve the problems in the conventional technology.

According to one aspect of the present invention, there is provided an optical scanning device that scans a scanning surface with a light beam. The optical scanning device includes a light source that emits the light beam; and a pre-deflector optical system that includes at least one diffractive optical element including a diffraction surface having no power at room temperature. The diffraction surface has a multi-step shape having a plurality of zone surfaces substantially perpendicular to an optical axis and a plurality of step surfaces each adjacent to each of the zone surfaces. On a cross sectional plane of the diffraction surface including the optical axis, each of the zone surfaces and each of the step surfaces makes an obtuse angle.

Furthermore, according to another aspect of the present invention, there is provided an image forming apparatus including at least one image carrier; and at least one optical scanning device that scans the at least one image carrier with a light beam modulated according to image information. The optical scanning device includes a light source that emits the light beam and a pre-deflector optical system that includes at least one diffractive optical element including a diffraction surface having no power at room temperature. The diffraction surface has a multi-step shape having a plurality of zone surfaces substantially perpendicular to an optical axis and a plurality of step surfaces each adjacent to each of the zone surfaces. On a cross sectional plane of the diffraction surface including the optical axis, each of the zone surfaces and each of the step surfaces makes an obtuse angle.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13A is a diagram of the shape of a far-field pattern (FFP) in a reference state;

FIG. 13B is a diagram of the shape of an FFP in a rotation state;

FIG. 14A is a diagram of emittance of a light beam on a plane orthogonal to the direction corresponding to sub-scanning in the reference state;

FIG. 14B is a diagram of emittance of a light beam on a plane orthogonal to the direction corresponding to sub-scanning in the rotation state;

FIGS. 15A and 15B are diagrams of the relationship between the focal length of a coupling lens and the amount of light at an effective diameter;

FIGS. 18A and 18B are diagrams (No. 1) of reflected light at a diffraction surface;

FIGS. 19A and 19B are diagrams (No. 2) of reflected light at a diffraction surface;

FIG. 20 is a table for explaining the optical surface shape of a deflector-side scanning lens;

FIG. 21 is a table for explaining the optical surface shape of an image-side scanning lens;

FIG. 22 is a table for explaining the optical surface shape of a collimator lens;

FIG. 25 is a table for explaining the optical surface shape of a deflector-side scanning lens in an optical system with another example structure;

FIG. 26 is a table for explaining the optical surface shape of an image-side scanning lens in an optical system with another example structure;

FIG. 27 is a table for explaining the positional relationship among major optical elements in an optical system with another example structure;

DETAILED DESCRIPTION OF THE PREFERRED EMBODIMENTS

Exemplary embodiments of the present invention are explained in detail below with reference to the accompanying drawings.

Figure 1:
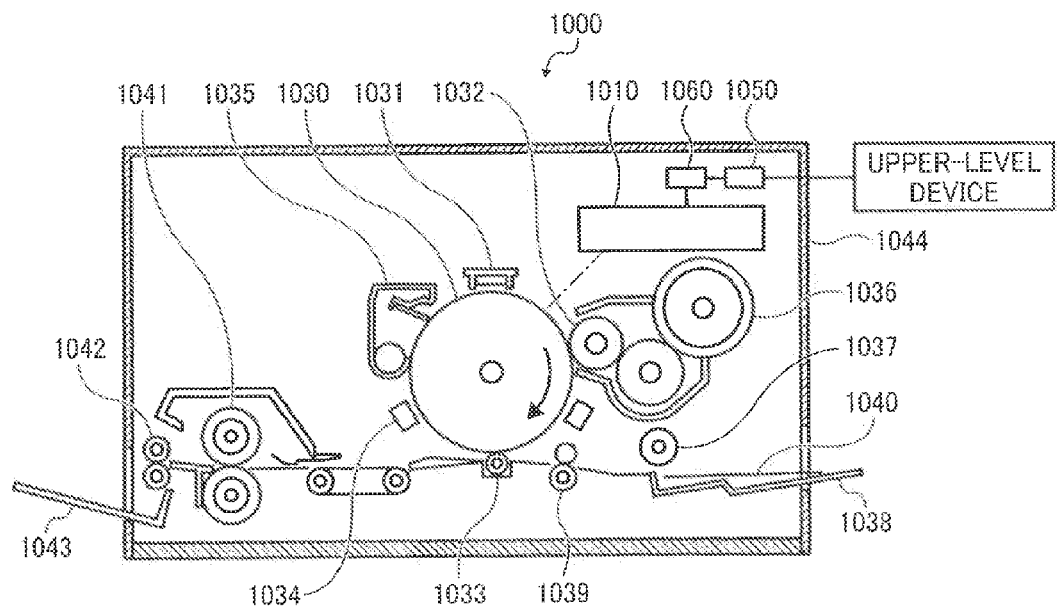
FIG. 1 is a schematic diagram of an exemplary structure of a laser printer according to an embodiment of the present invention.

FIG. 1 is a schematic diagram of a laser printer 1000 as an image forming apparatus according to the present invention.

The laser printer 1000 includes an optical scanning device 1010 according to a first embodiment of the present invention, a photosensitive drum 1030, a charging unit 1031, a developing roller 1032, a transfer charging unit 1033, a neutralizing unit 1034, a cleaning unit 1035, a toner cartridge 1036, a feed roller 1037, a feed tray 1038, a pair of registration rollers 1039, a fixing roller 1041, a discharge roller 1042, a discharge tray 1043, a communication control unit 1050, a printer control unit 1060 that controls each of the components, and so forth. These components are arranged at predetermined positions in a printer casing 1044.

The communication control unit 1050 controls a bi-directional communication with an upper-level device (e.g., a personal computer (PC)) via a network.

The photosensitive drum 1030 is a cylindrical member having a photosensitive layer formed on the surface thereof. The surface of the photosensitive drum 1030 is a scanning surface to be scanned. The photosensitive drum 1030 rotates in the direction indicated by the arrow shown in FIG. 1.

The charging unit 1031, the developing roller 1032, the transfer charging unit 1033, the neutralizing unit 1034, and the cleaning unit 1035 are arranged near the surface of the photosensitive drum 1030. More specifically, they are arranged in following order along the rotational direction of the photosensitive drum 1030: the charging unit 1031→the developing roller 1032→the transfer charging unit 1033→the neutralizing unit 1034→the cleaning unit 1035.

The charging unit 1031 uniformly charges the surface of the photosensitive drum 1030.

The optical scanning device 1010 irradiates the surface of the photosensitive drum 1030 charged by the charging unit 1031 with a light beam modulated based on image information from the upper-level device. By doing so, a latent image corresponding to the image information is formed on the surface of the photosensitive drum 1030. The formed latent image moves towards the developing roller 1032 along with the rotation of the photosensitive drum 1030.

Toner stored in the toner cartridge 1036 is supplied to the developing roller 1032.

The developing roller 1032 applies the toner supplied from the toner cartridge 1036 onto the latent image formed on the surface of the photosensitive drum 1030 to make the image information a visual image. The latent image having the toner applied thereon (hereinafter, also referred to as "a toner image" for the sake of convenience) moves towards the transfer charging unit 1033 along with the rotation of the photosensitive drum 1030.

Recording sheets 1040 are stored in the feed tray 1038. Near the feed tray 1038 is the feed roller 1037, which takes the recording sheets 1040 out of the feed tray 1038 one at a time and transports the recording sheet 1040 to the registration rollers 1039. The registration rollers 1039 temporarily holds the recording sheet 1040 taken out by the feed roller 1037 and feeds the recording sheet 1040 to between the photosensitive drum 1030 and the transfer charging unit 1033 along with the rotation of the photosensitive drum 1030.

A voltage of opposite polarity to that of the toner is applied to the transfer charging unit 1033 to electrically transfer the toner on the surface of the photosensitive drum 1030 onto the recording sheet 1040. With this voltage, the toner image on the surface of the photosensitive drum 1030 is transferred to the recording sheet 1040. The recording sheet 1040 with the transferred toner is sent to the fixing roller 1041.

The fixing roller 1041 applies heat and pressure to the recording sheet 1040, thereby causing the toner to be fixed on the recording sheet 1040. The recording sheets 1040 on which toner has been fixed in this manner are sent to the discharge tray 1043 via the discharge roller 1042 and are stacked on the discharge tray 1043 sequentially.

The neutralizing unit 1034 neutralizes the surface of the photosensitive drum 1030.

The cleaning unit 1035 removes any toner (residual toner) remaining on the surface of the photosensitive drum 1030 after transferring the toner image. The surface of the photosensitive drum 1030 from which the residual toner has been removed returns to a position facing the charging unit 1031.

The structure of the optical scanning device 1010 will now be described.

Figure 2:
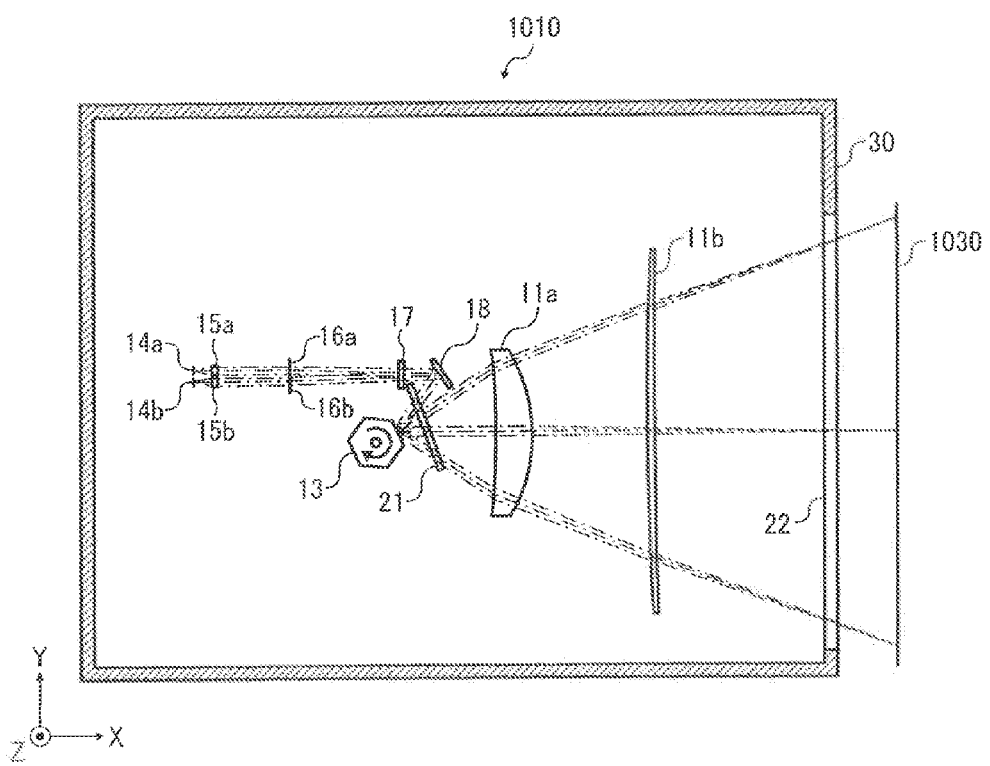
FIG. 2 is a schematic diagram of an optical scanning device in FIG. 1.

Referring to FIG. 2, the optical scanning device 1010 includes two light sources (14a and 14b), two coupling lenses (15a and 15b), two aperture plates (16a and 16b), a cylindrical lens 17, a reflecting mirror 18, a polygon mirror 13, a deflector-side scanning lens 11a, an image-side scanning lens 11b, a scan control apparatus (not shown in the figure), and so forth. These components are installed at predetermined positions in a housing 30.

The present specification assumes that the direction along the longitudinal direction of the photosensitive drum 1030 is the Y-axis direction and the direction along the optical axis of the scanning lenses (11a and 11b) is the X-axis direction in the XYZ three-dimensional Cartesian coordinate system.

Hereinafter, the direction corresponding to the main-scanning direction is referred to as "a direction corresponding to the main scanning" and the direction corresponding to the sub-scanning direction is referred to as "a direction corresponding to the sub-scanning" for the sake of convenience.

Figure 3A:
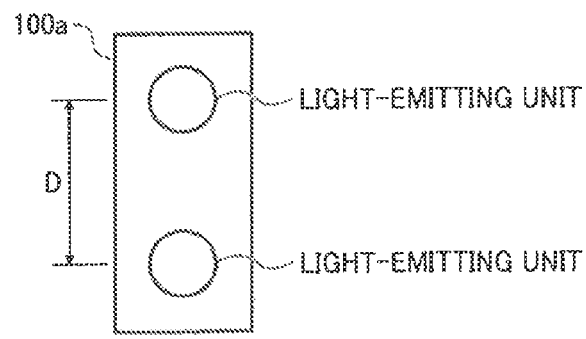
FIGS. 3A to 3C are diagrams for explaining a laser diode (LD) array included in a light source 14a in FIG. 2.
Figure 3B:
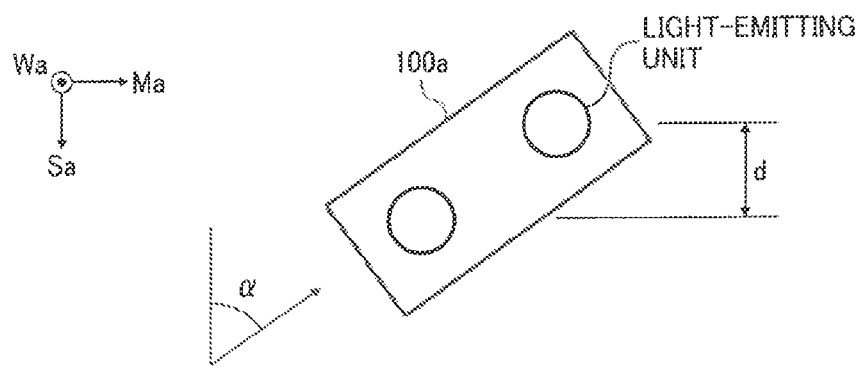

Referring to FIGS. 3A and 3B, the light source 14a includes an LD array 100a having two light-emitting units arranged along the longitudinal direction. In FIG. 3B, the Ma direction represents the direction corresponding to main scanning, and the Sa direction represents the direction corresponding to sub-scanning (same as the Z-axis direction in the embodiment). The Wa direction represents the exit direction of maximum intensity of a light beam from each of the light-emitting units.

Figure 3C:
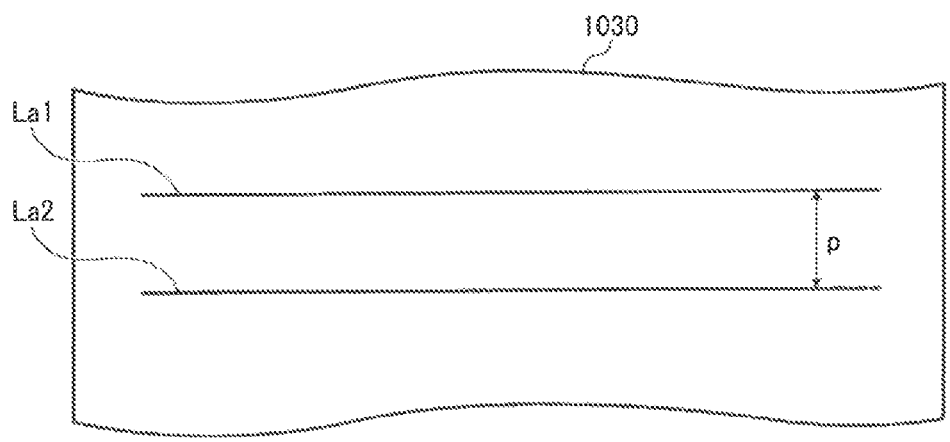

Referring to FIG. 3C, the distance D between the light-emitting units along the longitudinal direction is larger than the distance d between the light-emitting units in a case where the spacing p between neighboring scanning lines on the surface of the photosensitive drum 1030 gives half the desired resolution (1200 dpi in the embodiment). In the present specification, "the distance between the light-emitting units" refers to the center-to-center distance between the two light-emitting units.

As shown in FIG. 3B, the distance between the light-emitting units in the Sa direction is set to d, which is given by rotating the LD array 100a about an axis that passes through the center of the LD array 100a and is parallel to the Wa direction. The rotational angle α of the LD array 100a in this case is 55.5°.

Figure 4A:
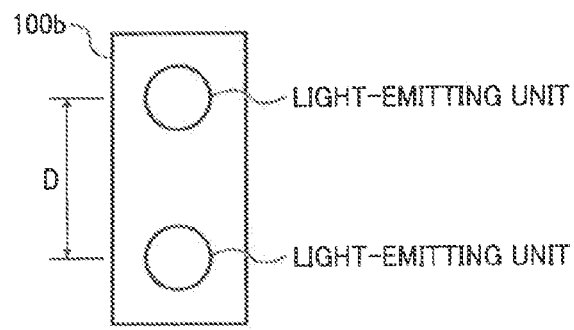
FIGS. 4A to 4C are diagrams for explaining an LD array included in a light source 14b in FIG. 2.
Figure 4B:
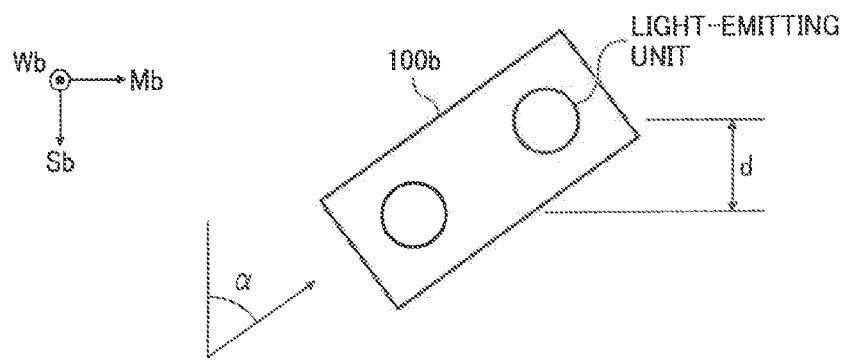

Referring to FIGS. 4A and 4B, the light source 14b includes, for example, an LD array 100b similar to the LD array 100a. In FIG. 4B, the Mb direction represents the direction corresponding to main scanning, and the Sb direction represents the direction corresponding to sub-scanning (same as the Z-axis direction in the embodiment). The Wb direction represents the exit direction of maximum intensity of a light beam from each of the light-emitting units.

The LD array 100b is rotated by angle α (55.5° in the embodiment) about an axis that passes through the center of the LD array 100b and is parallel to the Wb direction.

Figure 4C:
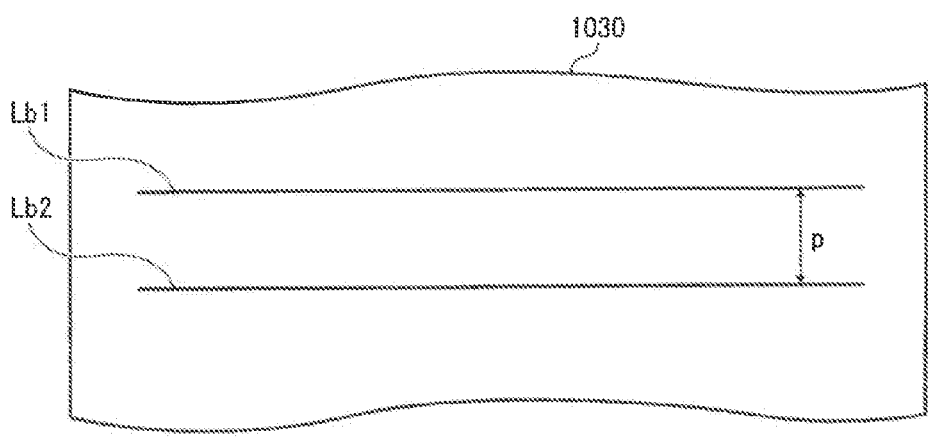

By doing so, the distance between the light-emitting units in the Sb direction after rotation is set to d. Thus, for example, the spacing p between neighboring scanning lines on the surface of the photosensitive drum 1030, as shown in FIG. 4C, gives a resolution that is half the desired resolution (1200 dpi in the embodiment).

With this technique, the surface of the photosensitive drum 1030 can be scanned simultaneously with four light beams.

Figure 5:
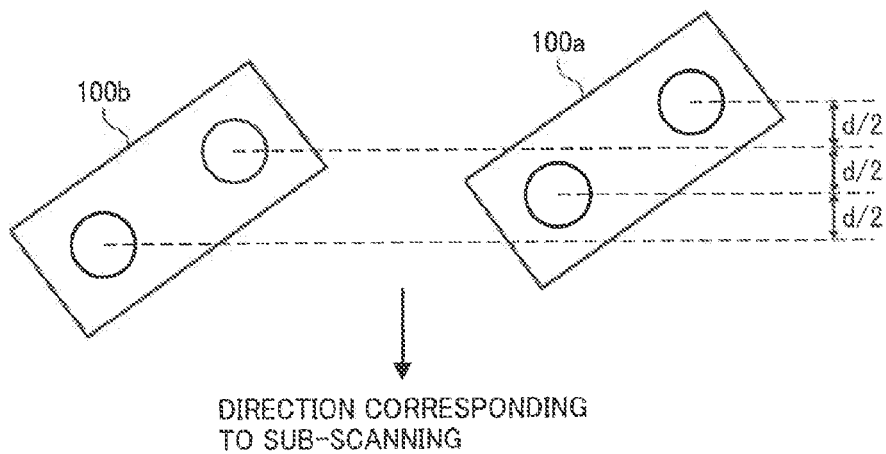
FIG. 5 is a diagram of the positional relationship between the LD arrays in the direction corresponding to sub-scanning.
Figure 6:
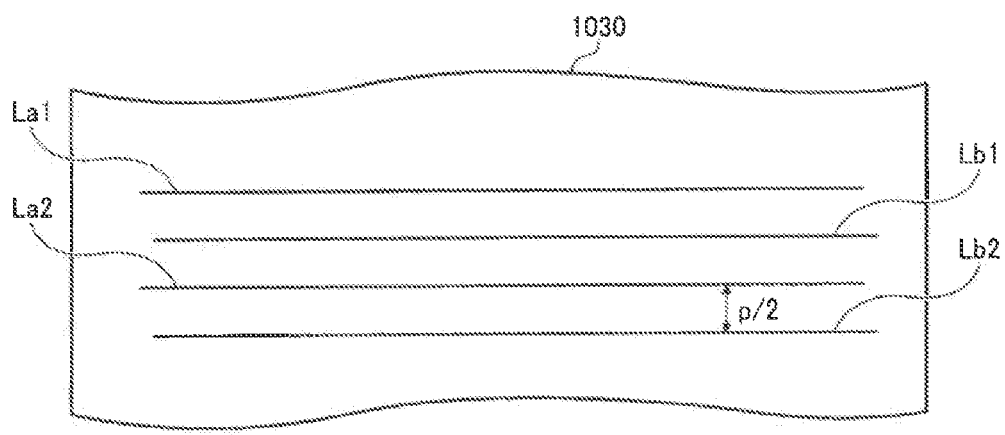
FIG. 6 is a diagram of scanning lines on the surface of a photosensitive drum.

Referring to FIG. 5, the light source 14a and the light source 14b are disposed, for example, in the direction corresponding to sub-scanning (same as the Z-axis direction in the embodiment) such that the four light-emitting units are arranged at regular intervals d/2 when they are orthogonally projected onto an imaginary line extending in the direction corresponding to sub-scanning. By doing so, for example, as shown in FIG. 6, the spacing between neighboring scanning lines on the surface of the photosensitive drum 1030 gives the desired resolution (1200 dpi in the embodiment). Reference numerals La1 and La2 in FIG. 6 denote the scanning lines of two light beams from the light source 14a, and reference numerals Lb1 and Lb2 denote the scanning lines of two light beams from the light source 14b.

Figure 7:
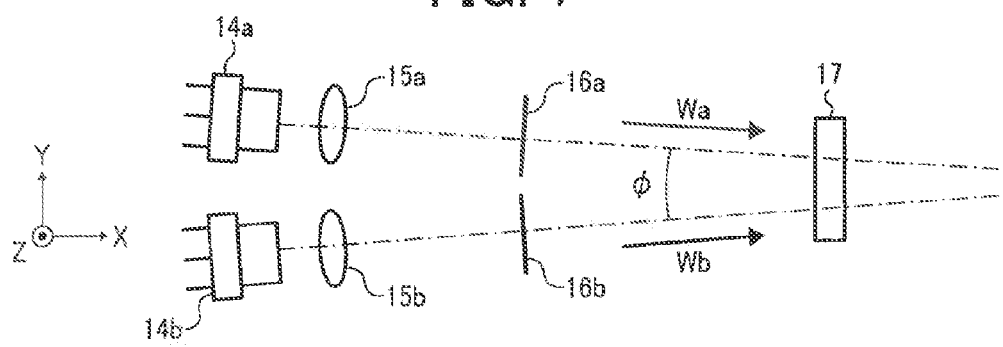
FIG. 7 is a diagram of the positional relationship between the light sources on a plane including the direction corresponding to main scanning.

In addition, as shown in FIG. 7, the light source 14a and the light source 14b are disposed such that the angle (crossing angle) between the Wa direction and the Wb direction is, for example, φ (3.1° in the embodiment) on the XY plane.

Each of the light-emitting units is an edge-emitting laser with a design oscillation wavelength of 655 nm.

Referring back to FIG. 2, the coupling lens 15a is disposed in the light path of the light beam from the light source 14a. Furthermore, the coupling lens 15b is disposed in the light path of the light beam from the light source 14b.

Each of the coupling lenses converts the light beam from the corresponding light source into substantially collimated light. In other words, the light beam from the corresponding light source is converted into a light beam shape suitable for the subsequent optical systems. Such a suitable light beam shape can be a collimated light beam, a weakly diverging light beam, or a weakly converging light beam.

Furthermore, the positions of the coupling lenses can be adjusted individually in the optical-axis direction, the direction corresponding to main scanning, and the direction corresponding to sub-scanning. The position of each coupling lens is adjusted separately according to the oscillation wavelength of the corresponding LD array so that a shift in imaging position resulting from variation in oscillation wavelength across the LD arrays becomes small.

Each of the coupling lenses is a glass lens with a focal length f of 27 mm at the design wavelength. For example, this glass has the following physical properties: the refractive index for 655-nm light is 1.57719 at standard temperature (25° C.), the refractive index for 655-nm light when the temperature is increased by 20° C. from the standard temperature is 1.57727, and the linear expansion coefficient is $7.0 \times 10^{-6}$/K.

Figure 8:
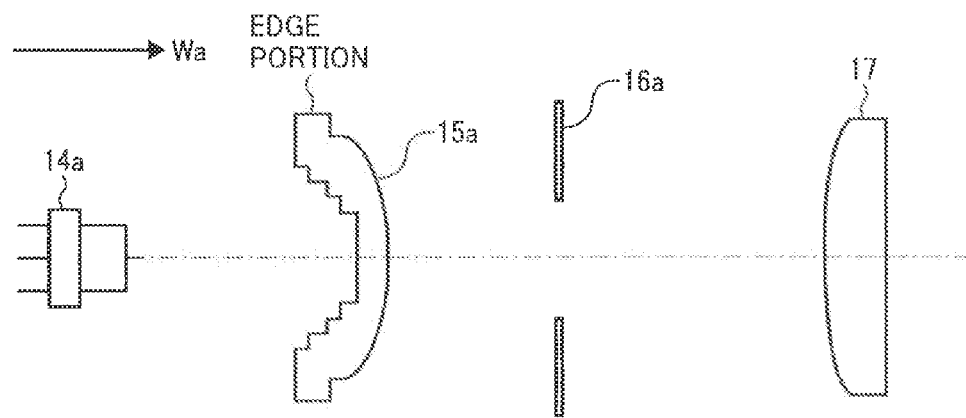
FIG. 8 is a diagram of a coupling lens in FIG. 2.

Each of the coupling lenses includes a refractive surface as an output plane (see FIG. 8). This refractive surface is a rotationally symmetric aspherical surface with a paraxial radius of curvature of −15.6 mm.

The Diffraction Surface

Figure 9:
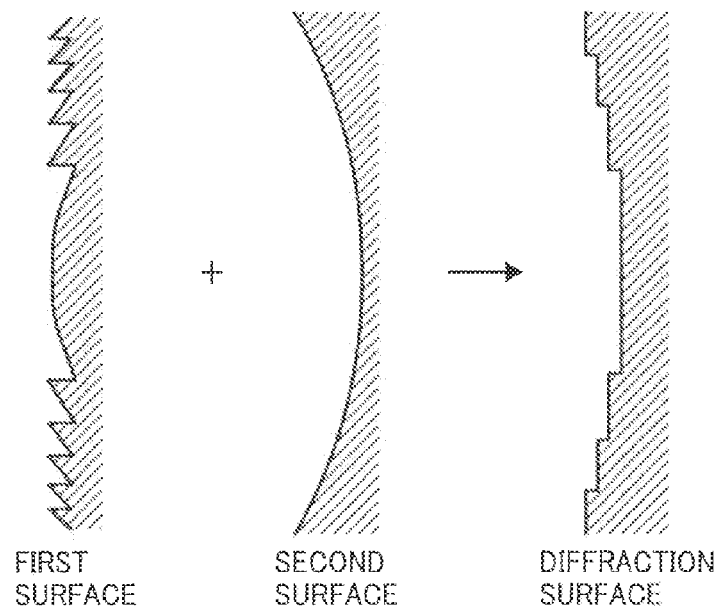
FIG. 9 is a diagram of a diffraction surface of a coupling lens in FIG. 2.

Each of the coupling lenses includes a diffraction surface as an incidence plane (see FIG. 8). For example, as shown in FIG. 9, this diffraction surface is generated by combining a surface exhibiting a diffraction effect (hereinafter, also referred to as "a first surface" for the sake of convenience) and a surface exhibiting a refraction effect (hereinafter, also referred to as "a second surface" for the sake of convenience). In this case, the diffraction surface is set such that the power of the first surface and the power of the second surface offset each other. Therefore, the diffraction surface of each coupling lens exhibits no power from a geometrical-optics standpoint.

Let the distance from the optical axis on a plane orthogonal to the optical axis be H: the phase function φ(H) of this first surface is given by Equation (1) below (a point on the optical axis is H=0)

$$\phi(H) = C_H H^2 \tag{1}$$

where $C_H = -1.519 \times 10^{-3}$ (mm$^{-1}$).

The second surface has a paraboloidal shape given by Equation (2)

$$x(H) = (1/2R) \cdot H^2 \tag{2}$$

where the radius of curvature is, for example, R=−190 mm.

A plurality of diffraction grooves on the diffraction surface of each coupling lens form concentric circular steps having the centers thereof aligned with the optical axis (see FIG. 9). In other words, a plurality of multi-level diffraction grooves are formed on the diffraction surface of each of the coupling lenses 15.

More specifically, the size of each of the steps is 1.135 μm. The minimum pitch (outermost zone) is 72.523 μm, and the number of steps is 20.

In the embodiment, each of the coupling lenses is endowed with more intense diffraction power than diffraction power required for correction of chromatic aberration at normal temperature. In other words, as far as correction of chromatic aberration is concerned, the diffraction power of each coupling lens is set to perform overcorrection.

Figure 10:
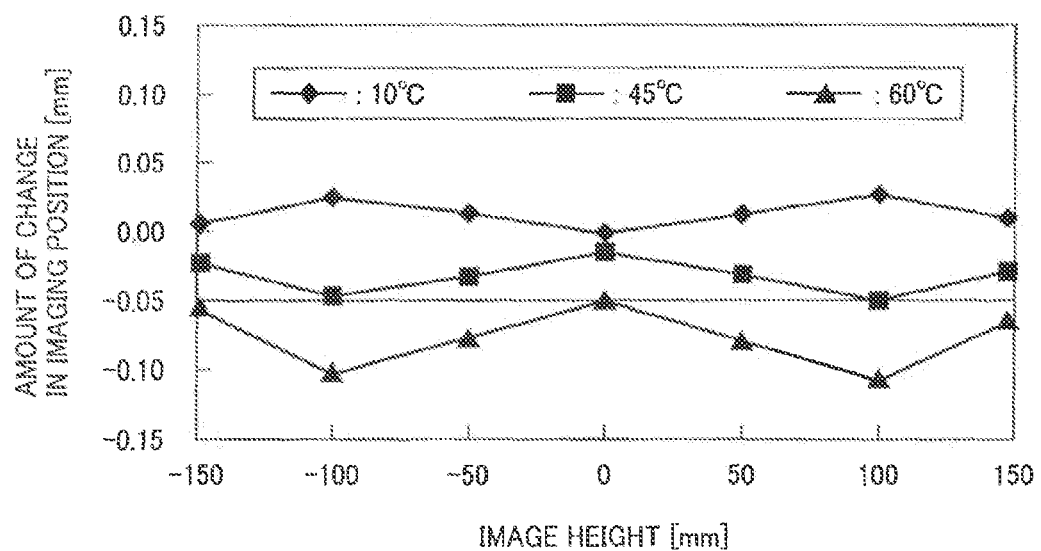
FIG. 10 is a graph for explaining the relationship between the amount of change in imaging position and temperature according to the embodiment.
Figure 11:
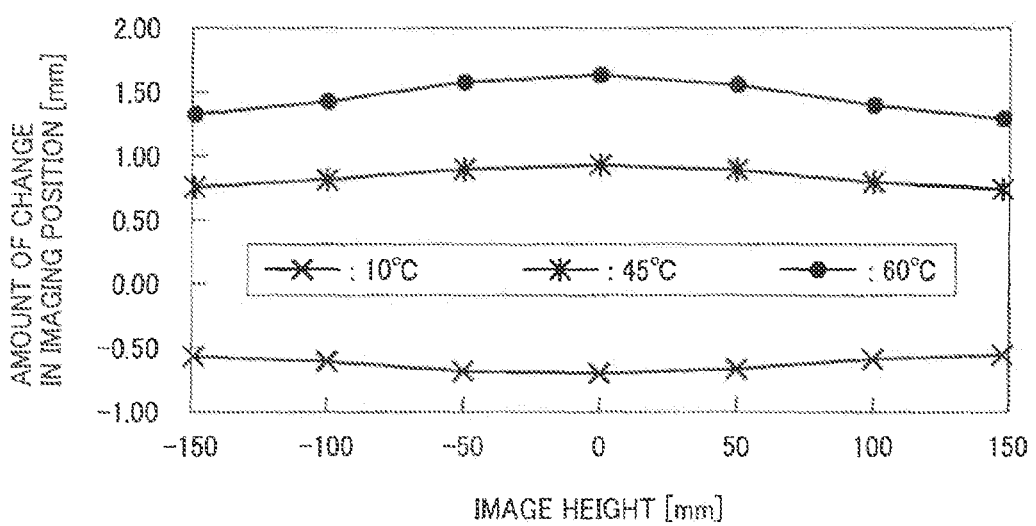
FIG. 11 is a graph for explaining the relationship between the amount of change in imaging position and temperature in a case where the diffractive optical element is not used.

FIG. 10 is a graph showing the amount of change in imaging position along the main-scanning direction on the surface of the photosensitive drum 1030 when the environmental temperature is 10° C., 45° C., and 60° C. As is apparent from this graph, the amount of change in the imaging position is within 0.20 mm, which ensures that sufficient temperature compensation is performed. FIG. 11 is a graph showing a comparative example where no diffraction surface is provided. The amount of change in imaging position in this case reaches almost 2.00 mm, which indicates that it is difficult to maintain superior imaging quality.

If the diffraction surface has a shape formed by folding the shape of a refractive surface with appropriate steps and pitches, the pitches gradually become smaller towards the outer edge of the lens. Therefore, it is difficult to make a mold for forming the diffraction surface. However, if the diffraction surface is formed by combining the first surface and the second surface having opposite power to each other, the zone surfaces are substantially orthogonal to the optical axis. This makes shape measurement easy. In particular, for a multi-level diffraction surface (hereinafter, referred to as "multi-step diffraction surface" for the sake of convenience), the zone surfaces are orthogonal to the optical axis.

Figure 12:
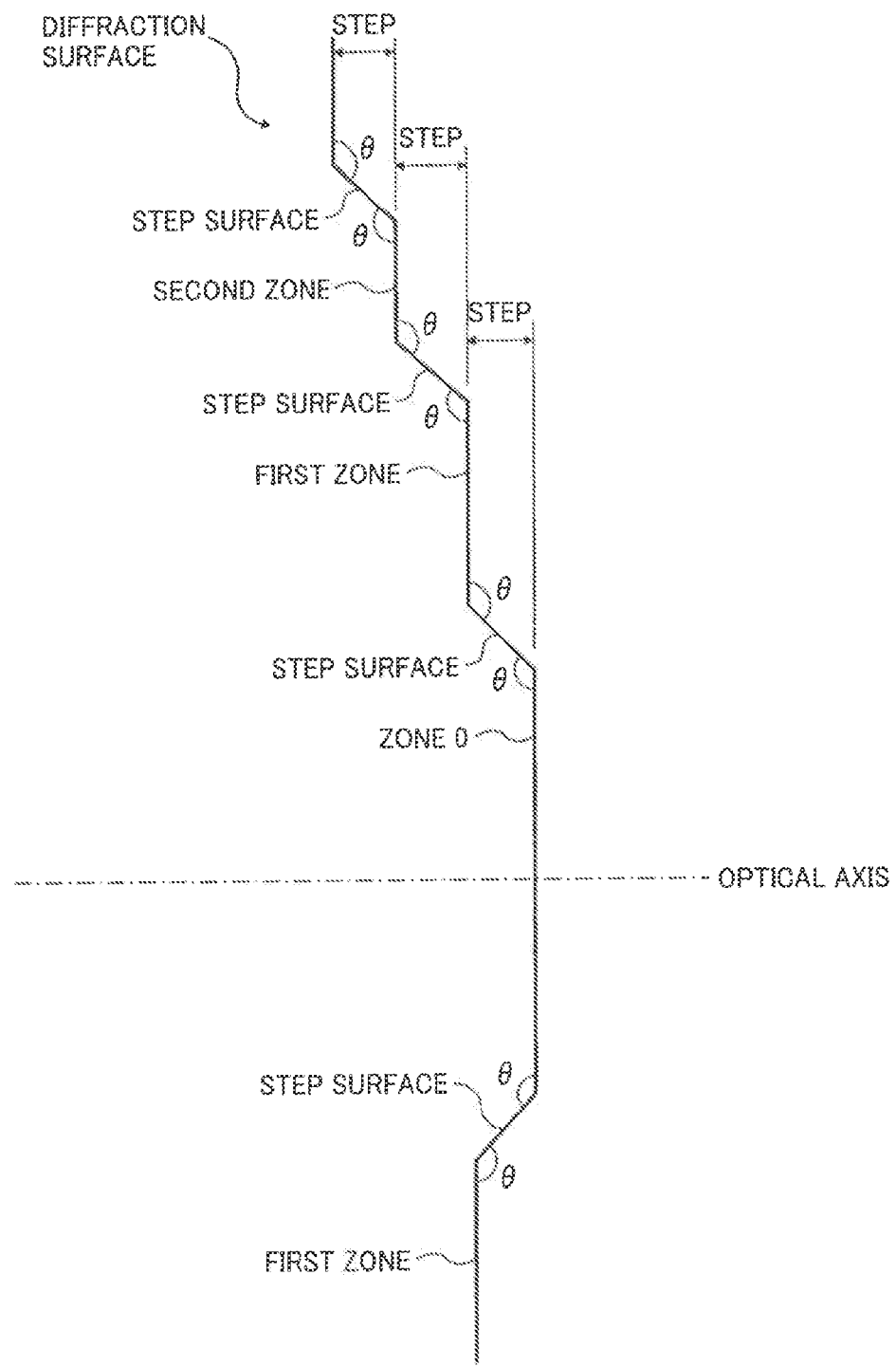
FIG. 12 is a diagram of step surfaces on a diffraction surface.

For example, referring to FIG. 12, in the embodiment, the angles θ between the zone surfaces and the step surfaces neighboring the zone surfaces on a cross-sectional plane including the optical axis are all obtuse angles. More specifically, to build steps with a height of 1.135 μm in the optical-axis direction between zone surfaces, each of the step surfaces has a width of about 6 μm in the height direction, and the angle θ between each zone surface and the neighboring step surface is 165°.

In general, a coupling lens is produced by molding. Because the angle θ is an obtuse angle in each of the coupling lenses according to the embodiment, a sufficiently large draft is provided. Therefore, the molded product is easy to remove from the mold, thereby enhancing the molding performance. The angle θ should preferably be larger than 135° and smaller than 170°.

In addition, because the multi-step diffraction surface exhibits no power from a geometrical-optics standpoint, the system is immune to a shift in the center of the incidence plane and the center of the output plane. This eliminates the need to achieve extremely high accuracy and allows a low-cost manufacturing process to be adopted.

Rotation of the LD Arrays and Focal Lengths of the Coupling Lenses

The far-field pattern (FFP) of the light beam emitted from an edge-emitting laser diode (LD) is typically elliptical. For example, the divergence angle (half width) is 19° in the long-axis direction and 9° in the short-axis direction. In an LD array having a one-dimensional array, a plurality of light-emitting units are normally arranged along the short-axis direction of the FFP (see FIG. 13A).

Hereinafter, a state in which a plurality of light-emitting units are arranged along the direction corresponding to sub-scanning is referred to as the reference state for the sake of convenience. In addition, the term "rotation of an LD array" refers to rotation about a rotation axis that is parallel to the optical axis and passes through the center of the LD array. The term "rotational angle" refers to a rotational angle relative to the reference state. Therefore, the reference state is a state in which the rotational angle is 0°.

When an LD array is rotated relative to the reference state, the elliptical shape of the FFP also rotates along with the rotation of the LD array, causing the elliptical shape of the FFP to change from the state shown in FIG. 13A to the state shown in FIG. 13B.

FIG. 14A depicts the state of divergence of the light beam from an LD array on a plane orthogonal to the direction corresponding to sub-scanning in a case where the elliptical shape of the FFP is as shown in FIG. 13A. FIG. 14B depicts the state of divergence of the light beam from an LD array on a plane orthogonal to the direction corresponding to sub-scanning in a case where the elliptical shape of the FFP is as shown in FIG. 13B.

As is apparent from FIGS. 14A and 14B, when the LD array is rotated relative to the reference state, the divergence angle on the plane orthogonal to the direction corresponding to sub-scanning becomes small. Therefore, an intensity distribution occurs at an aperture portion and the apodization becomes worse.

In this case, for example, as shown in FIGS. 15A and 15B, the apodization can be prevented from becoming worse by increasing the focal length f of the coupling lens.

The focal length f of the coupling lens should preferably satisfy Inequality (3) below using the thickness T of the coupling lens.

$$0.08 < T/f < 0.16 \tag{3}$$

If T/f is 0.16 or more, that is, if the thickness is large, costs increase. If T/f is 0.08 or less, the amount of light is insufficient.

In addition, because the thickness of the coupling lens significantly affects costs and the light transmittance, a good balance can be established among low costs, the light transmittance, and the amount of light by satisfying Inequality (3) above. For this reason, in the embodiment, the thickness of the coupling lens is set to 2.5 mm, and the focal length at the design wavelength is set to 27 mm.

Rotation of the LD Arrays and Depth of Spot Size

Figure 16:
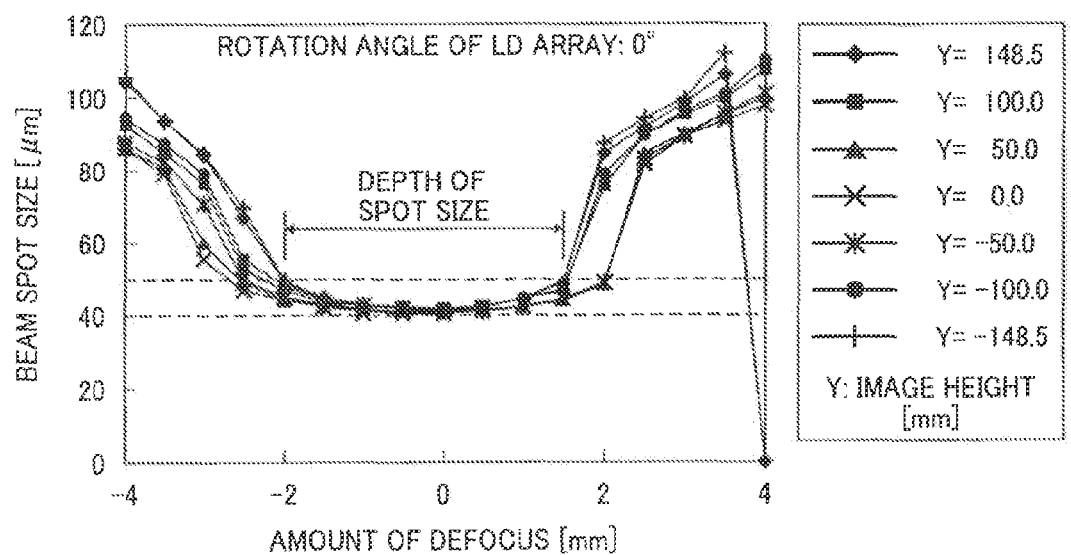
FIG. 16 is a graph for explaining the depth of spot size when an LD array is in the reference state.

FIG. 16 is a graph showing so-called depth of spot size of a light beam focused onto the surface of the photosensitive drum 1030 when an LD array is in the reference state. The term "depth of spot size" refers to the amount of defocus in which a beam spot size of 50 μm or less is maintained with any image height.

Figure 17:
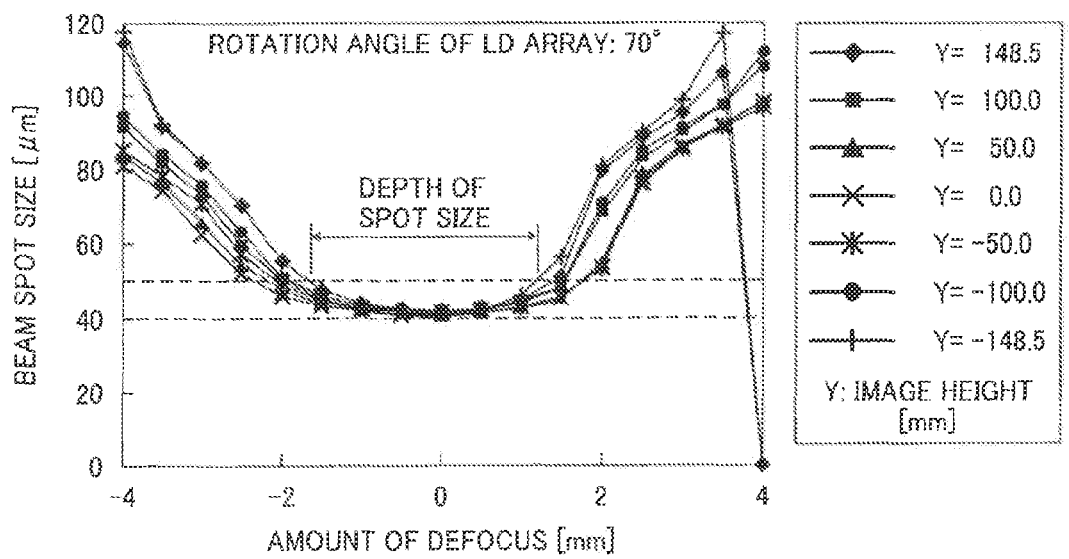
FIG. 17 is a graph for explaining the depth of spot size when an LD array is rotated by 70° relative to the reference state.

FIG. 17 is a graph showing the depth of spot size as obtained by rotating the LD array by 70° relative to the reference state.

As is apparent from FIG. 17, the depth of spot size becomes small with the rotation of the LD array. However, according to the embodiment, because each of the coupling lenses is endowed with diffraction power high enough to compensate for a change in imaging position due to a temperature change, as described above, the required depth of spot size can be achieved even when the LD array is rotated relative to the reference state.

Reflected Light on the Multi-Step Diffraction Surface

For example, as shown in FIG. 18A, when collimated light is incident upon the multi-step diffraction surface, the light reflected at the multi-step diffraction surface returns via the same light path as that of the incident light because the multi-step diffraction surface exhibits no power from a geometrical-optics standpoint. On the other hand, as shown in FIG. 18B, for example, when uncollimated light is incident upon the multi-step diffraction surface, the light reflected at the multi-step diffraction surface becomes a diverging light beam.

For example, as shown in FIG. 19A, if the output plane of the coupling lens is formed as a multi-step diffraction surface, the reflected light from the multi-step diffraction surface returns to the light source via the same light path as that of the incident light, because the light beam from the light source is converted into a collimated light beam before it reaches the output plane. This return light causes the output from the light source to be unstable, acting as a factor that degrades the image quality.

According to the embodiment, because the incidence plane of each of the coupling lenses is formed as a multi-step diffraction surface, for example, as shown in FIG. 19B, the reflected light from the multi-step diffraction surface is converted into a diverging light beam. Therefore, there is no risk of making the output from the light source unstable.

Edge Portion

Furthermore, according to the embodiment, each of the coupling lenses has an edge portion around an outer circumference thereof (see FIG. 8), and the transmittance of ultraviolet light at the edge portion is at least 30%. Because of this, after adjustment, the coupling lens can be bonded, for example, on an LD unit with UV curable resin. For this reason, a supporting mechanism that holds the coupling lens is not necessary, which contributes to a further reduction in cost.

Referring back to FIG. 2, the aperture plate 16a includes an aperture portion to specify the beam diameter of a light beam that has passed through the coupling lens 15a. The aperture plate 16b includes an aperture portion to specify the beam diameter of a light beam that has passed through the coupling lens 15b.

The cylindrical lens 17 focuses, in the direction corresponding to sub-scanning (the Z-axis direction in the embodiment), the light beam that has passed through the aperture portion of each aperture plate onto a point near the deflecting reflection surface of the polygon mirror 13 via the reflecting mirror 18. The cylindrical lens 17 is made of glass that has the following physical properties: the refractive index for 655-nm light is 1.5144 at standard temperature (25° C.) and the linear expansion coefficient is $7.5 \times 10^{-6}$/K.

The incidence plane of the cylindrical lens 17 is a cylindrical surface with a paraxial radius of curvature of 36.1 mm in the direction corresponding to sub-scanning (the Z-axis direction in the embodiment).

The optical system disposed in the light path between each of the light sources and the polygon mirror 13 is also referred to as a pre-deflector optical system. According to the embodiment, the pre-deflector optical system includes the two coupling lenses (15a and 15b), the two aperture plates (16a and 16b), the cylindrical lens 17, and the reflecting mirror 18.

Soundproof glass 21 is disposed between the reflecting mirror 18 and the polygon mirror 13 and between the polygon mirror 13 and the deflector-side scanning lens 11a.

The polygon mirror 13 includes, for example, a hexagonal mirror unit whose inscribed circle has a radius of 18 mm, and the mirrors each function as a deflecting reflection surface. The polygon mirror 13 deflects the light beam from the reflecting mirror 18 while rotating at a constant speed about an axis parallel to the direction corresponding to sub-scanning (the Z-axis direction in the embodiment).

The incident angle of the light beam from the light source 14a upon the polygon mirror 13 is 56.45° relative to the direction corresponding to main scanning and 0° relative to the direction corresponding to sub-scanning. Furthermore, the incident angle of the light beam from the light source 14b upon the polygon mirror 13 is 59.55° relative to the direction corresponding to main scanning and 0° relative to the direction corresponding to sub-scanning.

The deflector-side scanning lens 11a is arranged on the optical path of the light beam deflected by the polygon mirror 13.

The image-side scanning lens 11b is arranged on the optical path of the light beam that has passed through the deflector-side scanning lens 11a.

The optical system disposed in the light path between the polygon mirror 13 and the photosensitive drum 1030 is also called a scanning optical system. According to the embodiment, the scanning optical system includes the deflector-side scanning lens 11a and the image-side scanning lens 11b.

The light beam deflected at the polygon mirror 13 is focused onto the surface of the photosensitive drum 1030 by the scanning optical system. The light spot on the surface of the photosensitive drum 1030 moves in the longitudinal direction of the photosensitive drum 1030 along with the rotation of the polygon mirror 13. In short, the surface of the photosensitive drum 1030 is scanned. The moving direction of the light spot in this case corresponds to the "main-scanning direction".

Furthermore, dust-tight glass 22 is disposed between the image-side scanning lens 11b and the photosensitive drum 1030.

Each of the scanning lenses is made of resin and has a larger degree of expansion/contraction resulting from a temperature change than that of a glass lens. This resin has the following physical properties: the refractive index for 655-nm light is 1.5273 at standard temperature and the linear expansion coefficient is $7.0 \times 10^{-5}$/K.

The incidence plane (first surface) of the deflector-side scanning lens 11a and each surface of the image-side scanning lens 11b are a special toroidal surface. Each of the special toroidal surfaces is a surface whose curvature in the direction corresponding to sub-scanning changes according to the height of the lens in the direction corresponding to main scanning, represented as Equations (4) and (5) below. In Equation (4), $C_m = 1/R_y$.

$$x(y, z) = \frac{y^2 \cdot C_m}{1 + \sqrt{1 - (1+K) \cdot (y \cdot C_m)^2}} + A_4 \cdot y^4 + A_6 \cdot y^6 + \tag{4}$$

$$A_8 \cdot y^8 + A_{10} \cdot y^{10} + A_{12} \cdot y^{12} + \frac{Cs(y) \cdot z^2}{1 + \sqrt{1 - (Cs(y) \cdot z)^2}}$$

$$Cs(y) = \frac{1}{R_z} + B_1 \cdot y + B_2 \cdot y^2 + B_3 \cdot y^3 + B_4 \cdot y^4 + B_5 \cdot y^5 + B_6 \cdot y^6 \ldots \tag{5}$$

where x represents a depth in the optical-axis direction, $R_y$ represents a paraxial radius of curvature in the direction corresponding to main scanning (the Y-axis direction in the embodiment), $R_z$ represents a paraxial radius of curvature in the direction corresponding to sub-scanning (the Z-axis direction in the embodiment), y represents a distance from the optical axis in the direction corresponding to main scanning, z represents a distance from the optical axis in the direction corresponding to sub-scanning, K represents a conic constant, and $A_4$, $A_6$, $A_8$, $A_{10}$, $A_{12}$, $B_1$, $B_2$, $B_3$, ... are all coefficients.

The output plane (second surface) of the deflector-side scanning lens 11a is a rotationally symmetric aspherical surface. The aspherical surface used in the embodiment is given by Equation (6) below $$x(H) = \frac{CH^2}{1+\sqrt{1-(1+K)\cdot C^2 H^2}} + A_4 \cdot H^4 + A_6 \cdot H^6 + A_8 \cdot H^8 + A_{10} \cdot H^{10} \ldots \quad (6)$$

where C is the reciprocal of the paraxial radius of curvature (paraxial curvature) and H is the height from the optical axis.

FIG. 20 is a table showing values on the incidence plane (first surface) and the output plane (second surface) of the deflector-side scanning lens 11a.

FIG. 21 is a table showing values on the incidence plane (third surface) and the output plane (fourth surface) of the image-side scanning lens 11b.

Furthermore, FIG. 22 is a table showing values on the output plane of each of the coupling lenses.

According to the embodiment, the lateral magnification of the scanning optical system in the sub-scanning direction is −0.9879.

The length (writing width in the main-scanning direction) of the effective scanning area on the photosensitive drum 1030 is 320 mm. The half angle of view is 36.1°.

Figures 23, 24:
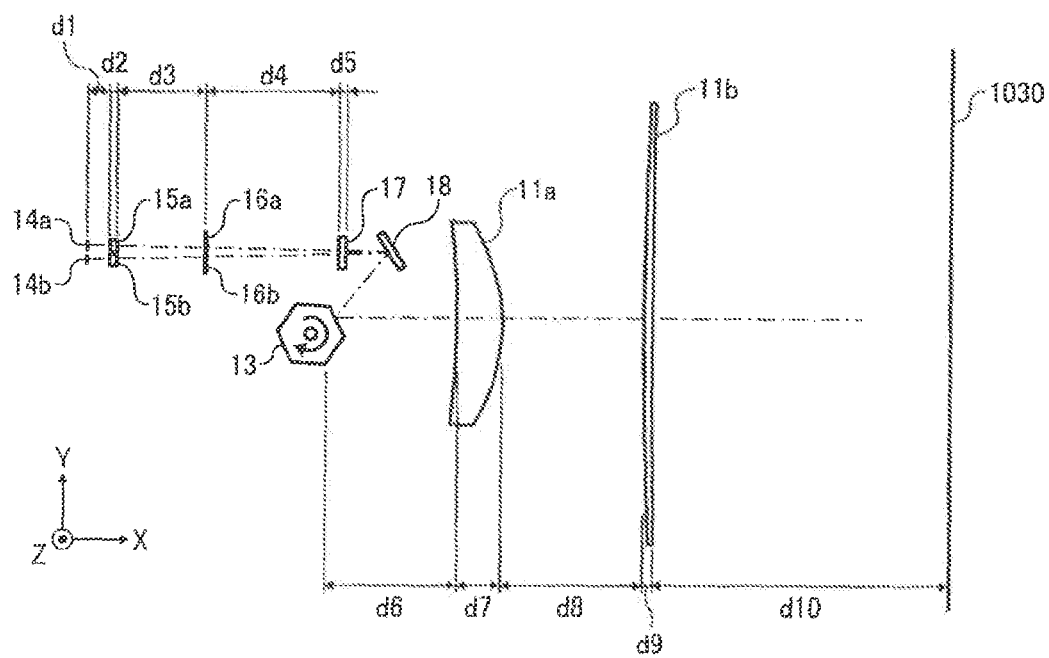
FIG. 23 is a diagram (No. 1) for explaining the positional relationship among major optical elements in an optical system shown in FIG. 2.
FIG. 24 is a table (No. 2) for explaining the positional relationship among major optical elements in an optical system shown in FIG. 2.

FIGS. 23 and 24 show specific positional relationships among major optical elements.

As described above, the optical scanning device 1010 according to the embodiment includes the two light sources (14a and 14b), the pre-deflector optical system, the polygon mirror 13, and the scanning optical system. The pre-deflector optical system includes the two coupling lenses (15a and 15b), the two aperture plates (16a and 16b), the cylindrical lens 17, and the reflecting mirror 18. Each of the coupling lenses has no power at room temperature and includes a multi-level diffraction surface having a plurality of zone surfaces substantially orthogonal to the optical axis and at least one step surface neighboring each of the zone surfaces. In addition, for this diffraction surface, the angle between each of the zone surfaces and its neighboring step surface is an obtuse angle on a cross-sectional plane including the optical axis. As a result, a low-cost diffractive optical element having a temperature-compensating function can be utilized. Therefore, stable optical scanning can be made possible without increasing costs.

In addition, because each of the coupling lenses according to the embodiment is substantially equivalent to a planoconvex lens, light-emitting units disposed far away from the optical axis can easily be corrected for aberration by forming a multi-step diffraction surface (substantially flat surface) on the coupling-lens surface upon which a diverging light beam is incident.

Furthermore, according to the embodiment, because the multi-step diffraction surface is formed on each of the coupling lenses, the structure of each coupling lens can be rotationally symmetric with respect to the optical axis. As a result, ease of mold making is further enhanced, and a coupling lens can be produced via lower-cost processes.

The external shape of each coupling lens should also preferably be rotationally symmetric. By doing so, the need to consider rotation about the optical axis is eliminated at the time of assembly, and the work required for assembly can be reduced.

A technique for using a plurality of LD elements each having one light-emitting unit to combine the light beams from the LD elements into multiple light beams may be employed. In this case, variation in oscillation wavelength across the LD elements is within a range of about ±10 nm, which is several times larger than the variation in oscillation wavelength across light-emitting units in one LD array. Because diffractive lenses with different light beam wavelengths cause different imaging positions, the variation in oscillation wavelength across LD elements is not negligible. One diffractive lens can be provided for each LD element if the coupling lens is realized by a diffractive lens. As a result, even if the oscillation wavelengths of a plurality of LD elements are different from one another, a desired light beam can be obtained according to the oscillation wavelength.

In addition, because the laser printer 1000 according to the embodiment includes the optical scanning device 1010 that makes it possible to perform stable optical scanning without increasing costs, a high-quality image can be produced stably without bringing about high cost.

Although the embodiment above has been described assuming that each of the light sources includes two light-emitting units, the number of light-emitting units is not limited to two.

Furthermore, although the embodiment above has been described assuming that two light sources are provided, the number of light sources is not limited to two.

In addition, although the embodiment above has been described assuming that the rotational angle α of the LD array in each of the light sources is 55.5°, the rotational angle α is not limited to 55.5°. The rotational angle α is determined according to the distance between the light-emitting units and the desired resolution in the LD array.

Furthermore, although the embodiment above has been described assuming that the polygon mirror 13 includes the hexagonal mirror unit, the polygon mirror 13 is not limited to a hexagonal mirror unit.

The structure of the optical scanning device 1010 according to the embodiment described above is just one example, and the structure is not limited to this example. Another example structure that can be adopted for the optical scanning device 1010 will now be described briefly with reference to FIGS. 25 to 28. The following description focuses only on differences from the embodiment described above. Components that are same as or similar to those in the embodiment described above are denoted by the same reference numerals, and a description thereof will be simplified or omitted.

(1) The rotational angle α of the LD array in each of the light sources is 70.6°. Furthermore, the incident angle of the light beam from the light source 14a upon the polygon mirror 13 is 62.45° relative to the direction corresponding to main scanning and 0° relative to the direction corresponding to sub-scanning. In addition, the incident angle of the light beam from the light source 14b upon the polygon mirror 13 is 65.55° relative to the direction corresponding to main scanning and 0° relative to the direction corresponding to sub-scanning.

(2) For each of the coupling lenses, $C_H=-1.560\times10^{-3}$, and the radius of curvature R of the second surface is −185 mm (R=−185 mm). Furthermore, the size of each of the multiple steps is 1.135 μm. The minimum pitch (outermost zone) is 69.878 μm, and the number of steps is 21.

(3) The polygon mirror 13 includes a tetragonal mirror unit whose inscribed circle has a radius of 8 mm.

(4) FIG. 25 is a table showing values on the incidence plane (first surface) and the output plane (second surface) of the deflector-side scanning lens 11a.

(5) FIG. 26 is a table showing values on the incidence plane (third surface) and the output plane (fourth surface) of the image-side scanning lens 11b.

(6) FIG. 27 is a table showing one example of specific values (in units of mm) of reference numerals d1 to d10.

Figure 28:
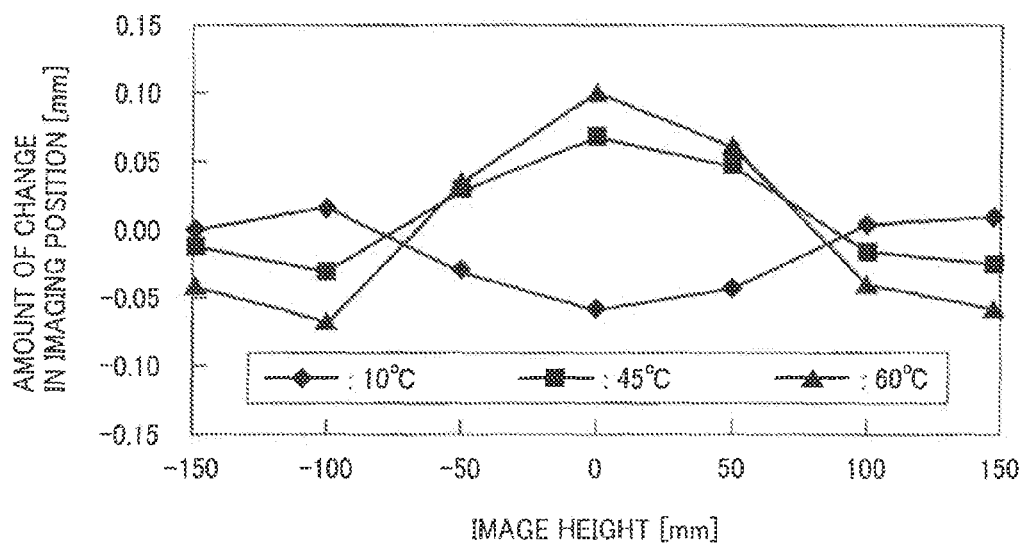
FIG. 28 is a graph for explaining the relationship between the amount of change in imaging position and temperature in an optical system with another example structure.

FIG. 28 is a graph showing the amount of change in imaging position along the main-scanning direction on the surface of the photosensitive drum 1030 at environmental temperatures of 10° C., 45° C., and 60° C. in this case. As is apparent from this graph, the amount of change in imaging position is within 0.20 mm, which ensures sufficient temperature compensation, as with the embodiment described above.

In the embodiment described above, each of the light sources and each of the coupling lenses may be combined into a light-source unit.

Figure 29:
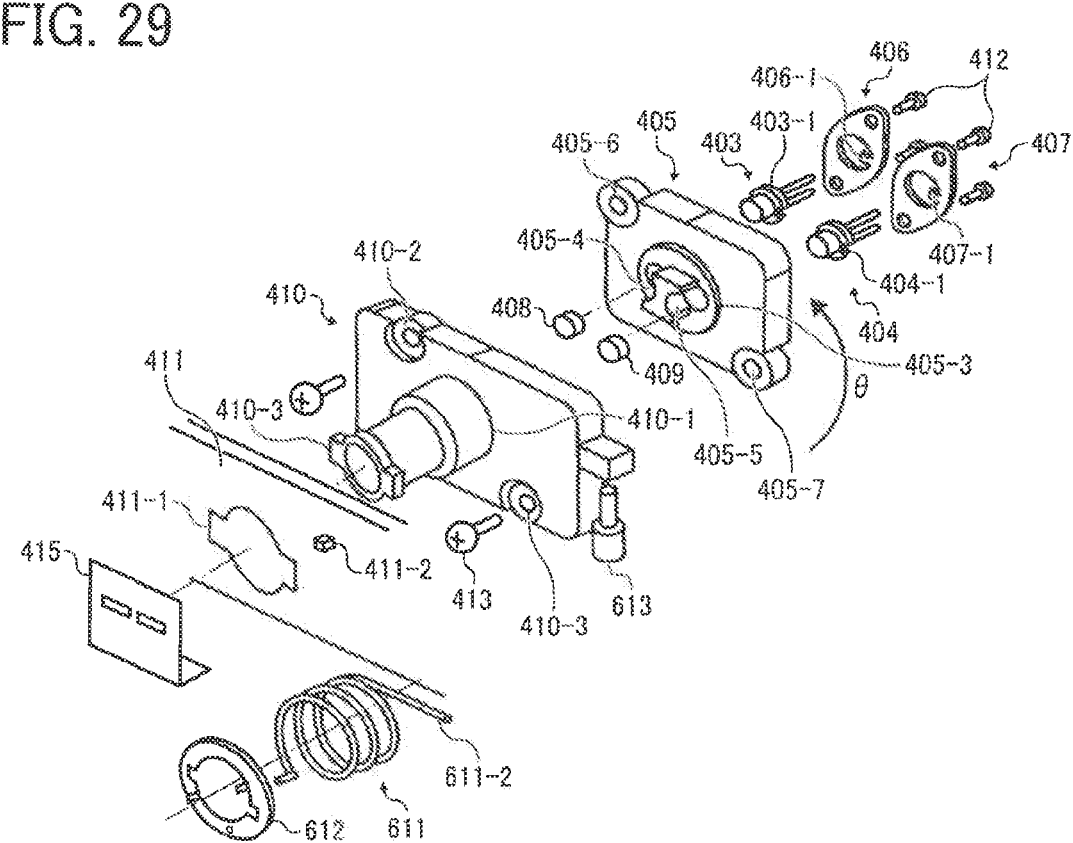
FIG. 29 is a diagram of a first embodiment of a light-source unit.

FIG. 29 is a diagram of a first embodiment of the light-source unit.

Semiconductor lasers (403 and 404) are individually fitted into two respective fitting holes (not shown in the figure) formed on the rear surface of a substrate 405. The fitting holes are tilted relative to each other by a predetermined angle (about 1.5° in the embodiment) on a plane including the direction corresponding to main scanning. The semiconductor lasers fitted into the respective fitting holes are also tilted with respect to each other by a predetermined angle (about 1.5° in the embodiment) on a plane including the direction corresponding to main scanning. Furthermore, notches are formed in cylindrical heatsinks (403-1 and 404-1) of the semiconductor lasers. The array directions of the light sources are aligned by fitting protrusions (406-1 and 407-1) formed in the central round holes of holding members (406 and 407) to the notch portions of the heatsinks. Each of the semiconductor lasers is fixed on the substrate 405 by retaining the holding members (406 and 407) to the substrate 405 with screws 412 from the rear side thereof. In addition, adjustment of the optical-axis direction of each of coupling lenses (408 and 409) is carried out by fitting the outer circumferences of the coupling lenses (408 and 409) along semi-circular mounting guide surfaces (405-4 and 405-5) of the substrate 405 for appropriate positioning, so that the diverging light beam emitted from the light-emitting units becomes a collimated light beam.

To make the lights from the semiconductor lasers intersect each other on a plane including the direction corresponding to main scanning, the fitting holes and the semi-circular mounting guide surfaces (405-4 and 405-5) are tilted along the direction of light beam. The substrate 405 is fixed to a holder 410 by bringing a cylindrical engaging portion 405-3 of the substrate 405 into engagement with the holder 410 and screwing a screw 413 into screw holes (405-6 and 405-7) through a through-hole 410-2.

A cylindrical portion 410-1 of the holder 410 is fitted into a reference hole 411-1 provided on a mounting wall 411 of an optical housing. The holder 410 is held in close contact with the rear side of the mounting wall 411 by inserting a spring 611 from the front side of the mounting wall 411 and bringing a stopper 612 into engagement with a protrusion 410-3 on the cylindrical portion, thus holding the light-source unit. Rotary force about the center of the cylindrical portion, serving as a rotation axis, is exerted on the light-source unit by hooking one end of the spring 611 to a protrusion 411-2 on the mounting wall 411 and hooking the other end of the spring 611 to the light-source unit. An adjusting screw 613 is included to lock the rotary force of the light-source unit, and with the adjusting screw 613, the entire unit can be made to turn about the optical axis (θ direction) for pitch adjustment.

Figure 30A:
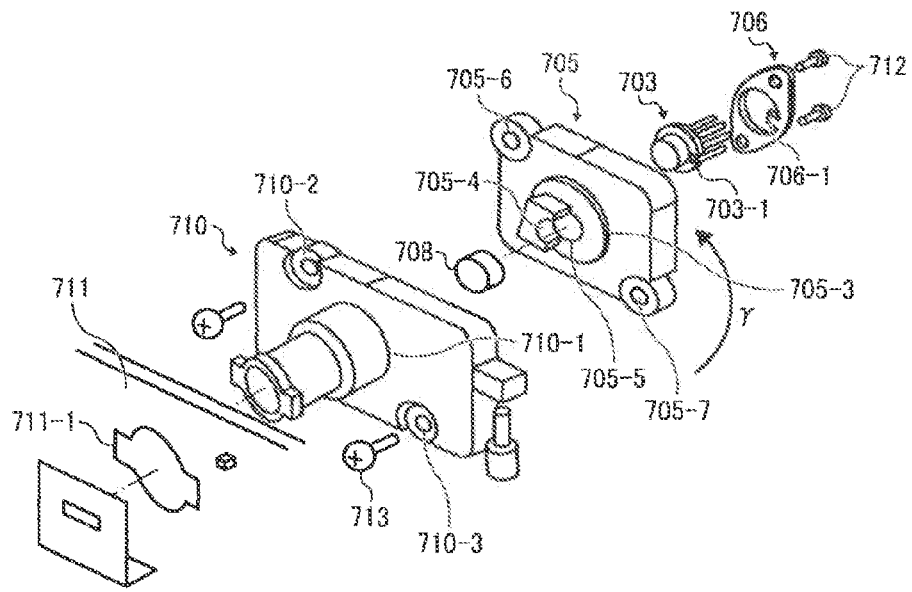
FIG. 30A is a diagram of a second embodiment of a light-source unit.

FIG. 30A is a diagram of a second embodiment of the light-source unit.

The light beams from a semiconductor laser 703 are combined by a beam combining unit. Referring to FIG. 30A, reference numeral 706 denotes a holding member, reference numeral 705 denotes a substrate, and reference numeral 710 denotes a holder. The second embodiment differs from the first embodiment in that only one semiconductor laser 703 is provided as the light source, and in accordance with the, only one holding member 706 is provided; other structures are basically the same.

Figure 30B:
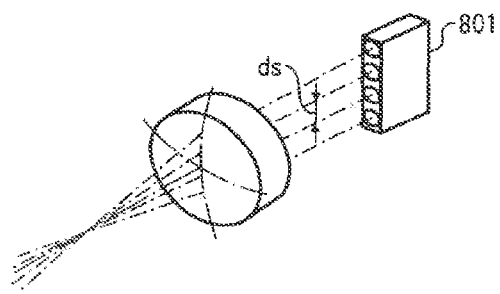
FIG. 30B is a diagram of a third embodiment of a light-source unit.

FIG. 30B is a diagram of a characteristic part of a third embodiment of the light-source unit. The third embodiment is similar to the second embodiment in structure; in the third embodiment, the light source includes a semiconductor laser array 801 with four light-emitting units. The light beams from the semiconductor laser array 801 are combined by the beam combining unit. The basic components according to the third embodiment are the same as those according to the first embodiment and the second embodiment, and a description thereof will be omitted.

In addition, in the embodiment described above, a vertical-cavity surface-emitting laser (VCSEL) array (surface-emitting laser array) may be used in place of the LD array.

Although the embodiment above has been described assuming that the image forming apparatus is realized by the laser printer 1000, the image forming apparatus is not limited to a laser printer. In short, any image forming apparatus including the optical scanning device 1010 can form high-quality images stably without increasing costs.

For example, an image forming apparatus in which media that develop color with a laser beam (e.g., paper sheet) are irradiated directly with a laser beam is also acceptable.

Furthermore, an image forming apparatus in which silver-halide film is used as the image bearing member is also acceptable. In this case, a latent image is formed on the silver-halide film by optical scanning, and the latent image can be visualized through processing similar to a development process of the normal silver-halide photographic process. Thereafter, the visualized image can be transferred to printing paper through processing similar to printing of the normal silver-halide photographic process. Such an image forming apparatus can be realized as a photo-platemaking apparatus or a photo-imaging apparatus that produces, for example, CT scan images.

In addition, even image forming apparatuses that form multi-color images can form high-quality images at high speed without increasing costs by using an optical scanning device that supports color images.

Figure 31:
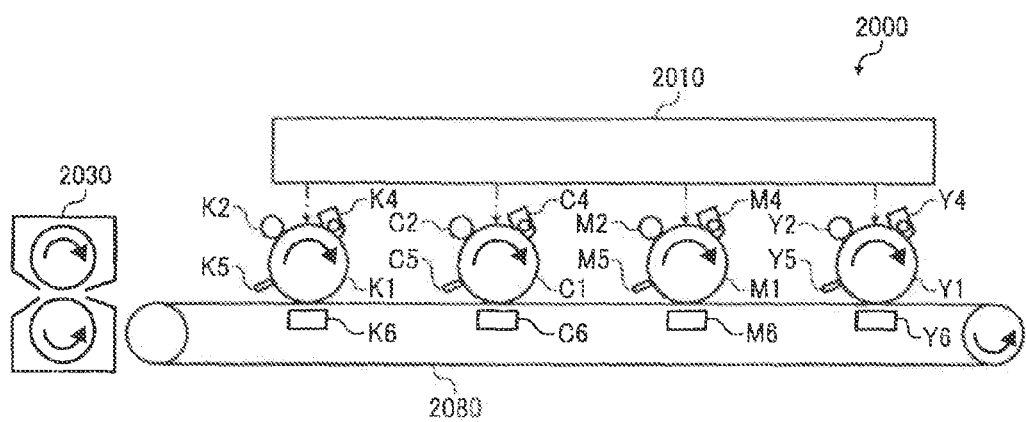
FIG. 31 is a schematic diagram of an exemplary structure of a tandem color printer.

For example, a color printer 2000 including a plurality of photosensitive drums is also acceptable, as shown in FIG. 31.

The color printer 2000 is a tandem multi-color printer that forms full-color images by overlapping four colors (black, cyan, magenta, and yellow). The color printer 2000 includes a photosensitive drum K1, a charging apparatus K2, a developing apparatus K4, a cleaning unit K5, and a transfer apparatus K6 for black; a photosensitive drum C1, a charging apparatus C2, a developing apparatus C4, a cleaning unit C5, and a transfer apparatus C6 for cyan; a photosensitive drum M1, a charging apparatus M2, a developing apparatus M4, a cleaning unit M5, and a transfer apparatus M6 for magenta; a photosensitive drum Y1, a charging apparatus Y2, a developing apparatus Y4, a cleaning unit Y5, and a transfer apparatus Y6 for yellow; an optical scanning device 2010; a conveyor belt 2080; a fixing unit 2030; and so forth.

Each of the photosensitive drums rotates in the direction indicated by the corresponding arrow in FIG. 31. Around each of the photosensitive drums, a charging apparatus, a developing apparatus, a transfer apparatus, and a cleaning unit are arranged along the rotational direction. Each of the charging apparatuses uniformly charges the surface of the corresponding photosensitive drum. The surface of each of the photosensitive drums charged by the charging apparatus is irradiated with light from the optical scanning device 2010, and an electrostatic latent image is formed on each of the photosensitive drums. Thereafter, a toner image is formed on the surface of each of the photosensitive drums by the corresponding developing apparatus. Furthermore, a toner image of each color is transferred onto a recording sheet by the corresponding transfer apparatus, and finally an image is fixed on the recording sheet by the fixing unit 2030.

The optical scanning device 2010 includes a light source similar to the light sources (14*a* and 14*b*) described above, a pre-deflector optical system similar to the pre-deflector optical system described above, and a scanning optical system similar to the scanning optical system described above, for each color. The light beam from each of the light sources is deflected by a common deflector and emitted to the corresponding photosensitive drum via the corresponding scanning optical system.

In short, the optical scanning device 2010 includes a plurality of coupling lenses each having a diffraction surface with no power at room temperature. Each of the coupling lenses includes a multi-level diffraction surface having a plurality of zone surfaces substantially orthogonal to the optical axis and at least one step surface neighboring each of the zone surfaces. In addition, for this diffraction surface, the angle between each of the zone surfaces and its neighboring step surface is an obtuse angle on a cross-sectional plane including the optical axis.

Thus, the optical scanning device 2010 can afford similar advantages to those of the optical scanning device 1010. The color printer 2000 can form high-quality color images stably without increasing costs.

In the color printer 2000, the optical scanning device 1010 described above may be employed for each color in place of the optical scanning device 2010 described above.

According to the first aspect, because a low-cost diffractive optical element with a temperature-compensating function can be employed, stable optical scanning can be carried out without increasing costs.

Furthermore, according to another aspect of the present invention, because at least one optical scanning device according to the present invention is provided, a high-quality image can be formed stably without incurring high costs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a scanning surface with a light beam, the optical scanning device comprising:
   a light source that emits the light beam; and
   a pre-deflector optical system that includes at least one diffractive optical element including a diffraction surface, wherein
   the at least one diffractive optical element includes an edge portion around an outer circumference thereof, the edge portion being perpendicular to an optical axis and bonded to a holding member with UV curable resin, and the transmittance of light at the edge portion is at least 30%,
   wherein the diffraction surface has a multi-step shape having a plurality of zone surfaces, all of the zone surfaces are perpendicular to the optical axis, each of the plurality of zone surfaces includes a first end and a second end such that each of the plurality of zone surfaces is oriented perpendicular to the optical axis along an entire length of the zone surface from the first end to the second end, and the multi-step shape includes a plurality of step surfaces, a step surface of the plurality of step surfaces is provided respectively between each zone surface and a subsequent zone surface, and
   wherein the light source includes a plurality of light-emitting units and a plurality of light beams from the respective light-emitting units enter a same diffractive optical element.

2. The optical scanning device according to claim 1, wherein the at least one diffractive optical element is made of glass.

3. The optical scanning device according to claim 1, wherein the diffraction surface is formed on a light beam incidence surface or a light beam output surface, whichever has a larger emittance of a reflecting beam.

4. The optical scanning device according to claim 1, wherein the at least one diffractive optical element performs overcorrection of chromatic aberration.

5. The optical scanning device according to claim 1, wherein the at least one diffractive optical element has a shape that is rotationally symmetric about the optical axis.

6. The optical scanning device according to claim 1, wherein
   the pre-deflector optical system further includes a coupling optical system that converts the light beam from the light source into a substantially collimated light, and
   the at least one diffractive optical element is included in the coupling optical system.

7. The optical scanning device according to claim 1, wherein
   the diffraction surface is formed by combining a first surface exhibiting a diffraction effect and a second surface exhibiting a refraction effect, and
   a power of the first surface and a power of the second surface cancel each other.

8. The optical scanning device according to claim 1 wherein the light source includes a plurality of light-emitting units.

9. The optical scanning device according to claim 8, wherein the light-emitting units are vertical-cavity surface-emitting lasers arranged in an array.

10. The optical scanning device according to claim 8, wherein a value obtained by dividing thickness of the at least one diffractive optical element by focal length at a design wavelength of the at least one diffractive optical element is larger than 0.08 and smaller than 0.16.

11. An image forming apparatus comprising:

at least one image carrier; and at least one optical scanning device that scans the at least one image carrier with a light beam modulated according to image information, the optical scanning device including a light source that emits the light beam, and a pre-deflector optical system that includes at least one diffractive optical element including a diffraction surface, wherein the at least one diffractive optical element includes an edge portion around an outer circumference thereof, the edge portion being perpendicular to an optical axis and bonded to a holding member with UV curable resin, and the transmittance of light at the edge portion is at least 30%, wherein the diffraction surface has a multi-step shape having a plurality of zone surfaces, all of the zone surfaces are perpendicular to the optical axis, each of the plurality of zone surfaces includes a first end and a second end such that each of the plurality of zone surfaces is oriented perpendicular to the optical axis along an entire length of the zone surface from the first end to the second end, and the multi-step shape includes a plurality of step surfaces, a step surface of the plurality of step surfaces is provided respectively between each zone surface and a subsequent zone surface, and wherein the light source includes a plurality of light-emitting units and a plurality of light beams from the respective light-emitting units enter a same diffractive optical element.

12. The image forming apparatus according to claim 11, wherein the image information is color image information.

13. The optical scanning device according to claim 1, wherein on a cross sectional plane of the diffraction surface including the optical axis, an angle formed between the step surfaces and each of the respective zone surfaces and the subsequent zone surfaces, is an obtuse angle.

14. The image forming apparatus according to claim 11, wherein on a cross sectional plane of the diffraction surface including the optical axis, an angle formed between the step surfaces and each of the respective zone surfaces and the subsequent zone surfaces, is an obtuse angle.

15. The optical scanning device according to claim 1, wherein the pre-deflector optical system that includes at least one diffractive optical element includes a diffraction surface having no power at room temperature.

16. The optical scanning device according to claim 1, wherein all of the zone surfaces have a same perpendicularity to the optical axis.

* * * * *